US010756343B2

(12) United States Patent
Kurita et al.

(10) Patent No.: US 10,756,343 B2
(45) Date of Patent: *Aug. 25, 2020

(54) POSITIVE-ELECTRODE ACTIVE MATERIAL FOR LITHIUM SECONDARY CELL, POSITIVE ELECTRODE FOR LITHIUM SECONDARY CELL, AND LITHIUM SECONDARY CELL

(71) Applicants: SUMITOMO CHEMICAL COMPANY, LIMITED, Tokyo (JP); TANAKA CHEMICAL CORPORATION, Fukui-shi, Fukui (JP)

(72) Inventors: Hiroyuki Kurita, Osaka (JP); Jun-ichi Kageura, Tsukuba (JP); Yuichiro Imanari, Tsukuba (JP); Yasutaka Iida, Fukui (JP); Daisuke Yamashita, Fukui (JP); Takaaki Masukawa, Fukui (JP); Hiroyuki Ito, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 74 days.

This patent is subject to a terminal disclaimer.

(21) Appl. No.: 15/577,727

(22) PCT Filed: Jun. 2, 2016

(86) PCT No.: PCT/JP2016/066467
§ 371 (c)(1),
(2) Date: Nov. 28, 2017

(87) PCT Pub. No.: WO2016/195036
PCT Pub. Date: Dec. 8, 2016

(65) Prior Publication Data
US 2018/0159127 A1 Jun. 7, 2018

(30) Foreign Application Priority Data

Jun. 2, 2015 (JP) .................... 2015-112440

(51) Int. Cl.
H01M 4/00 (2006.01)
H01M 4/525 (2010.01)
(Continued)

(52) U.S. Cl.
CPC ............ *H01M 4/525* (2013.01); *C01G 53/50* (2013.01); *C01G 53/66* (2013.01); *H01M 4/505* (2013.01);
(Continued)

(58) Field of Classification Search
CPC .. H01M 4/525; H01M 10/0525; H01M 4/505; H01M 2004/021; H01M 2004/028;
(Continued)

(56) References Cited

U.S. PATENT DOCUMENTS 6,447,958 B1 9/2002 Shinohara et al.
10,297,824 B2 * 5/2019 Iida .................. C01G 53/50
(Continued)

FOREIGN PATENT DOCUMENTS

CN 1723576 A 1/2006
CN 1856890 A 11/2006
(Continued)

OTHER PUBLICATIONS

Search Report issued in corresponding International Patent Application No. PCT/JP2016/066467, dated Sep. 6, 2016.
(Continued)

*Primary Examiner* — Nicholas P D'Aniello
(74) *Attorney, Agent, or Firm* — McDermott Will & Emery LLP

(57) ABSTRACT

A positive electrode active material for a lithium secondary cell, having a layered structure and comprising at least
(Continued)

nickel, cobalt and manganese, the positive electrode active material satisfying requirements (1), (2) and (3) below: (1) a composition represented by a composition formula: $Li[Li_x(Ni_\alpha Co_\beta Mn_\gamma M_\delta)_{1-x}]O_2$, wherein $0 \leq x \leq 0.10$, $0.30 < \alpha \leq 0.34$, $0.30 < \beta \leq 0.34$, $0.32 \leq \gamma < 0.40$, $0 \leq \delta \leq 0.10$, $\beta < \gamma$, $\delta + \alpha + \beta + \gamma = 1$, M represents at least one metal selected from the group consisting of Fe, Cu, Ti, Mg, Al, W, Zn, Sn, Zr, Ga and V; (2) a secondary particle diameter of 2 μm or more and 10 μm or less; and (3) a maximum peak value in a pore diameter range of 90 nm to 150 nm in a pore diameter distribution determined by mercury porosimetry.

14 Claims, 1 Drawing Sheet

(51) Int. Cl.
- *H01M 4/505* (2010.01)
- *C01G 53/00* (2006.01)
- *H01M 10/0525* (2010.01)
- *H01M 4/02* (2006.01)

(52) U.S. Cl.
CPC ..... *H01M 10/0525* (2013.01); *C01P 2002/20* (2013.01); *C01P 2002/50* (2013.01); *C01P 2002/60* (2013.01); *C01P 2004/45* (2013.01); *C01P 2004/50* (2013.01); *C01P 2004/51* (2013.01); *C01P 2004/61* (2013.01); *C01P 2006/11* (2013.01); *C01P 2006/12* (2013.01); *C01P 2006/14* (2013.01); *C01P 2006/17* (2013.01); *C01P 2006/40* (2013.01); *H01M 2004/021* (2013.01); *H01M 2004/028* (2013.01)

(58) Field of Classification Search
CPC ..... C01G 53/50; C01G 53/66; C01P 2006/11; C01P 2004/50; C01P 2004/51; C01P 2004/45; C01P 2002/60; C01P 2002/20; C01P 2004/61; C01P 2002/50; C01P 2006/12; C01P 2006/14; C01P 2006/17; C01P 2006/40
See application file for complete search history.

(56) References Cited

U.S. PATENT DOCUMENTS

| | | | |
|---|---|---|---|
| 2002/0053663 A1 | 5/2002 | Ito et al. | |
| 2004/0234857 A1 | 11/2004 | Shiozaki et al. | |
| 2006/0134521 A1 | 6/2006 | Shima | |
| 2008/0032199 A1 | 2/2008 | Ohzuku et al. | |
| 2009/0035659 A1 | 2/2009 | Takeuchi et al. | |
| 2009/0104530 A1 | 4/2009 | Shizuka et al. | |
| 2009/0142668 A1 | 6/2009 | Ishii | |
| 2009/0258296 A1 | 10/2009 | Kawasato et al. | |
| 2010/0020977 A1 | 1/2010 | Furukawa | |
| 2010/0209771 A1 | 8/2010 | Shizuka et al. | |
| 2011/0171529 A1 | 7/2011 | Kono et al. | |
| 2011/0206990 A1 | 8/2011 | Akagi et al. | |
| 2013/0011726 A1* | 1/2013 | Takano | C01G 45/1228 429/188 |
| 2013/0029216 A1* | 1/2013 | Kim | C01G 45/1228 429/188 |
| 2013/0045421 A1 | 2/2013 | Kobino et al. | |
| 2013/0052535 A1 | 2/2013 | Yanagihara et al. | |
| 2016/0372749 A1 | 12/2016 | Iida et al. | |

FOREIGN PATENT DOCUMENTS

| | | |
|---|---|---|
| CN | 101447586 A | 6/2009 |
| CN | 101796672 A | 8/2010 |
| EP | 1391950 A1 | 2/2004 |
| EP | 1667260 A1 | 6/2006 |
| EP | 2 006 937 A2 | 12/2008 |
| EP | 2 555 287 A1 | 2/2013 |
| JP | 10-162860 A | 6/1998 |
| JP | 10-324758 A | 12/1998 |
| JP | H10-324758 A | 12/1998 |
| JP | 2000-030686 A | 1/2000 |
| JP | 2001-076724 A | 3/2001 |
| JP | 2002-201028 A | 7/2002 |
| JP | 2005-123179 A | 5/2005 |
| JP | 2008-103308 A | 5/2008 |
| JP | 2008-305777 A | 12/2008 |
| JP | 2009-152188 A | 7/2009 |
| JP | 4556377 B2 | 10/2010 |
| JP | 2010-278015 A | 12/2010 |
| JP | 2011-003551 A | 1/2011 |
| JP | 2011-029132 A | 2/2011 |
| JP | 2011-105588 A | 6/2011 |
| JP | 2012-22896 A | 2/2012 |
| JP | 2012-054135 A | 3/2012 |
| JP | 2012-234766 A | 11/2012 |
| JP | 2015-018678 A | 1/2015 |
| JP | 2015-041600 A | 3/2015 |
| WO | 2009/099158 A1 | 8/2009 |
| WO | 2011/083861 A1 | 7/2011 |

OTHER PUBLICATIONS

Extended European Search Report issued in corresponding European Patent Application No. 16803470.0-1106, dated Dec. 14, 2018.
Chinese Office Action issued in corresponding Chinese Patent Application No. 201680030998.7, dated Mar. 4, 2020, with English translation.
Japanese Notice of Reasons for Refusal issued in corresponding Japanese Patent Application No. 2017-522257, dated Feb. 18, 2020, with English translation.
Written Opinion dated Oct. 7, 2014 from corresponding Application No. PCT/JP2014/067555, 9 pages.
Extended European Search Report dated Jan. 20, 2017 from corresponding European Patent Application No. 1423282.0, 5 pages.
Japanese Office Action dated Aug. 29, 2016 from corresponding Japanese Application No. 2015-027964, 10 pages.
Entire U.S. PTO associated with related U.S. Appl. No. 14/902,041, filed Dec. 30, 2015, now U.S. Pat. No. 10,297,824, dated May 21, 2019.
Chinese Office Action dated Mar. 3, 2017 from corresponding Chinese Patent Application No. 201480038864.0, 11 pages.
U.S. PTO Non-Final Office Action issued in corresponding related U.S. Appl. No. 14/902,041, dated Sep. 27, 2017.
U.S. PTO Final Office Action issued in corresponding related U.S. Appl. No. 14/902,041, dated Apr. 17, 2018.
U.S. PTO Notice of Allowance issued in corresponding related U.S. Appl. No. 14/902,041, dated Jan. 15, 2019.
Chinese Office Action issued in corresponding Chinese Patent Application No. 201480038864.0, dated Oct. 23, 2017.
The Japan Society for Analytical Chemistry, X-ray Analysis Research Council (Feb. 10, 2002). Funmatsu X-sen Kaiseki-no Jissai- Rietveld-hou Nyuumon [Facts of X-ray Powder Analysis—Introduction to the Rietveld Method], 20 pages.
Naseda, Yoshio and Matsubara, Eiichiro (third edition, Apr. 30, 2002). X-sen Kozou Kaiseki—Genshi-no Hairetsu-o Kimeru—[X-ray Structural Analysis—Determining an Arrangement of Atoms -]. Tokoyo, Japan: Uchida Rokakuho Publishing, 10 pages.
Office Action (with English translation) dated Jan. 13, 2015 from corresponding Japanese Application No. 2013-144947, 6 pages.
Decision to Grant a Patent received Feb. 6, 2015 from corresponding Japanese Application No. 2013-144947, 5 pages.
International Search Report and Written Opinion dated Oct. 7, 2014 from International Patent Application No. PCT/JP2014/067555, 11 pages.

(56) References Cited

OTHER PUBLICATIONS

International Preliminary Report on Patentability dated Jan. 21, 2016 from corresponding Application No. PCT/JP2014/067555, 11 pages.

* cited by examiner

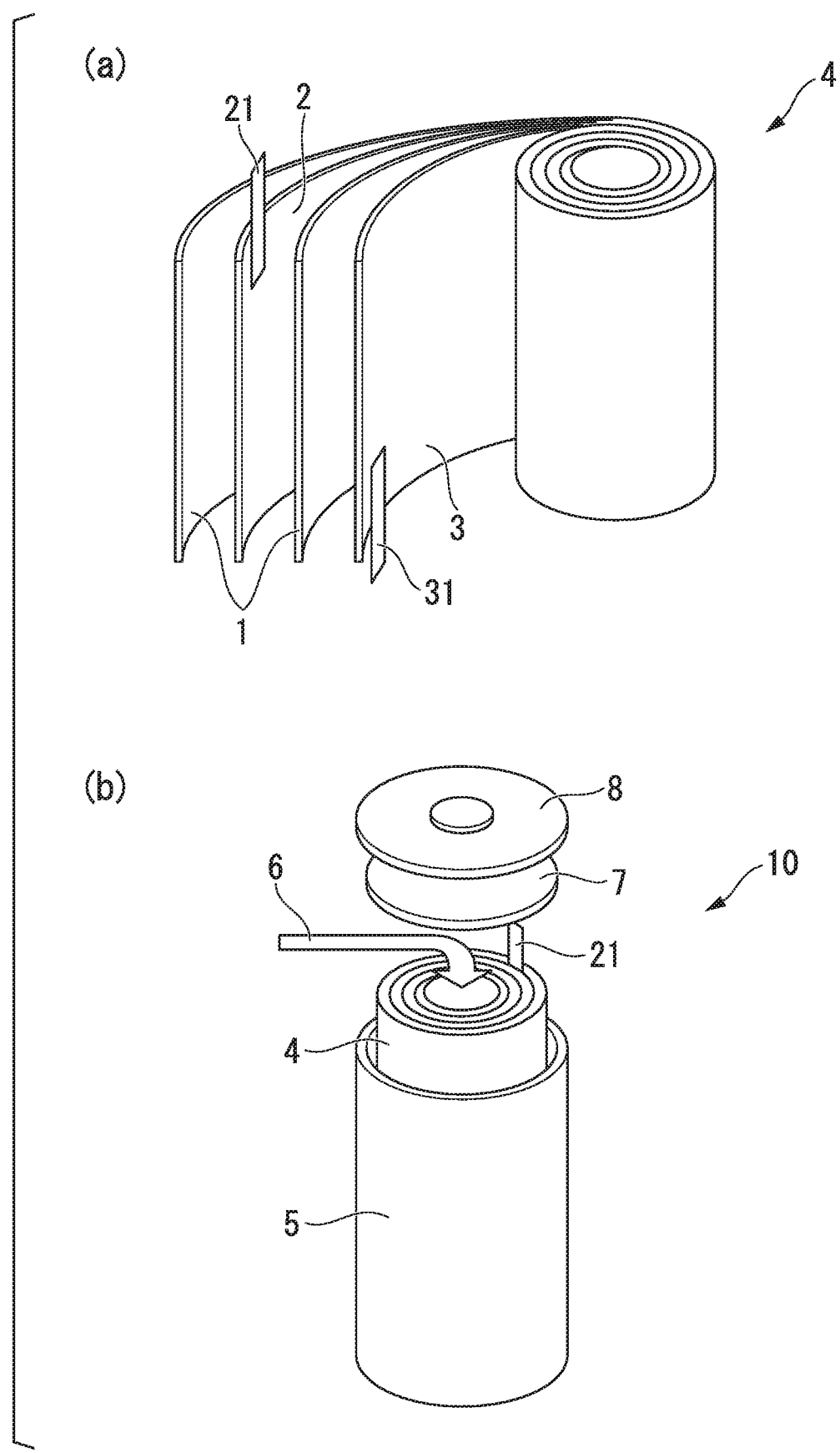

POSITIVE-ELECTRODE ACTIVE MATERIAL FOR LITHIUM SECONDARY CELL, POSITIVE ELECTRODE FOR LITHIUM SECONDARY CELL, AND LITHIUM SECONDARY CELL

CROSS REFERENCE

This application is the U.S. National Phase under 35 U.S.C. § 371 of International Application No. PCT/JP2016/066467, filed on Jun. 2, 2016, which claims the benefit of Japanese Application No. 2015-112440, filed on Jun. 2, 2015, the entire contents of each are hereby incorporated by reference.

TECHNICAL FIELD

The present invention relates to a positive electrode active material for a lithium secondary cell, a positive electrode for a lithium secondary cell and a lithium secondary cell.

Priority is claimed on Japanese Patent Application No. 2015-112440, filed Jun. 2, 2015, the contents of which are incorporated herein by reference.

BACKGROUND ART

Lithium metal composite oxides are used as positive electrode active materials for lithium secondary batteries. Lithium secondary cells have already been put to practical use as compact power supplies for portable telephones, notebook computers and the like. Further, the applications of lithium secondary cells in medium- and large-sized power supplies for automobile use, electric power storage use, etc. have also been attempted.

As a conventional positive electrode active material, for example, Patent Document 1 discloses a positive electrode active material for a lithium secondary cell, which uses a lithium-nickel-cobalt-manganese composite oxide represented by a composition formula $Li_aNi_{1/3}Co_{1/3}Mn_{1/3}O_2$, and has a pore diameter in the range of 10 to 200 nm.

PRIOR ART REFERENCES

Patent Document
Patent Document 1: Japanese Unexamined Patent Application Publication No. 2015-018678

DISCLOSURE OF INVENTION

Problems to be Solved by the Invention

However, regarding the conventional positive electrode for lithium secondary cells obtained by using a lithium-containing metal composite compound as the positive electrode active material, when such a positive electrode is pressurized to increase the electrode density, the particles of the positive electrode active material are likely to be crushed. Thus, there is room for further improvement.

The present invention has been made in view of the above situation, and the object of the present invention is to provide a positive electrode active material for a lithium secondary cell, which can prevent the particles of the positive electrode active material from being crushed when the positive electrode active material is pressurized. Further, the other objects of the present invention are to provide a positive electrode for a lithium secondary cell using such a positive electrode active material, and to provide a lithium secondary cell using such a positive electrode active material.

Means to Solve the Problems

The present invention in a first aspect thereof provides a positive electrode active material for a lithium secondary cell, having a layered structure and comprising at least nickel, cobalt and manganese, the positive electrode active material satisfying requirements (1), (2) and (3) below:

(1) a composition represented by a composition formula:

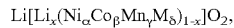

$Li[Li_x(Ni_\alpha Co_\beta Mn_\gamma M_\delta)_{1-x}]O_2$, wherein $0 \leq x \leq 0.10$, $0.30 < \alpha \leq 0.34$, $0.30 < \beta \leq 0.34$, $0.32 \leq \gamma < 0.40$, $0 \leq \delta \leq 0.10$, $\beta < \gamma$, $\delta + \alpha + \beta + \gamma = 1$, M represents at least one metal selected from the group consisting of Fe, Cu, Ti, Mg, Al, W, Zn, Sn, Zr, Ga and V;

(2) a secondary particle diameter of 2 μm or more and 10 μm or less; and (3) a maximum peak value in a pore diameter range of 90 nm to 150 nm in a pore diameter distribution determined by mercury porosimetry.

In the first aspect of the present invention, it is preferable that the secondary particle diameter is 2.5 μm or more and 7 μm or less.

In the first aspect of the present invention, it is preferable that the positive electrode active material has a BET specific surface area of 1.5 m²/g or more and 2.5 m²/g or less.

In the first aspect of the present invention, it is preferable that the pore volume of pores having diameters in the range of 10 nm to 200 nm in the pore distribution determined by mercury porosimetry is 0.025 cm³/g or more and 0.045 cm³/g or less.

The present invention in a second aspect thereof provides a positive electrode for a lithium secondary cell, including the positive electrode active material of the first aspect.

The present invention in a third aspect thereof provides a lithium secondary cell, including the positive electrode of the second aspect.

Effect of the Invention

The present invention can provide a positive electrode active material for a lithium secondary cell, which can prevent the particles of the positive electrode active material from being crushed when the positive electrode active material is pressurized.

Further, the present invention can also provide a positive electrode for a lithium secondary cell using such a positive electrode active material, and provide a lithium secondary cell using such a positive electrode active material.

BRIEF DESCRIPTION OF THE DRAWINGS

FIG. 1 is a schematic view showing one example of the lithium secondary cell.

DESCRIPTION OF THE EMBODIMENTS

[Positive Electrode Active Material for Lithium Secondary Cell]

The positive electrode active material for a lithium secondary cell in the first aspect of the present invention has a layered structure and comprises at least nickel, cobalt and manganese, the positive electrode active material satisfying requirements (1), (2) and (3) below:

(1) a composition represented by a composition formula:

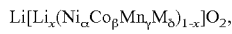
$$Li[Li_x(Ni_\alpha Co_\beta Mn_\gamma M_\delta)_{1-x}]O_2,$$

wherein 0≤x≤0.10, 0.30<α≤0.34, 0.30<β≤0.34, 0.32≤γ<0.40, 0≤δ≤0.10, β<γ, δ+α+β+γ=1, M represents at least one metal selected from the group consisting of Fe, Cu, Ti, Mg, Al, W, Zn, Sn, Zr, Ga and V;

(2) a secondary particle diameter of 2 μm or more and 10 μm or less; and (3) a maximum peak value in a pore diameter range of 90 nm to 150 nm in a pore diameter distribution determined by mercury porosimetry.

Requirement (1): Composition Formula

In the composition formula, α is preferably 0.30<α<0.33, and more preferably 0.30<α≤0.32.

In the composition formula, γ is preferably 0.33<γ<0.40, and more preferably 0.33<γ≤0.38.

(Layered Structure)

The crystal structure of the lithium metal composite oxide used in the positive electrode active material for a lithium secondary cell according to the first aspect of the present invention is a layered structure. The layered structure is preferably a hexagonal crystal structure or a monoclinic crystal structure.

The hexagonal crystal structure belongs to any one of the space group selected from the group consisting of P3, P3$_1$, P3$_2$, R3, P-3, R-3, P312, P321, P3$_1$12, P3$_1$21, P3$_2$12, P3$_2$21, R32, P3m1, P31m, P3c1, P31c, R3m, R3c, P-31m, P-31c, P-3m1, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6mm, P6cc, P6$_3$cm, P6$_3$mc, P-6m2, P-6c2, P-62m, P-62c, P6/mmm, P6/mcc, P6$_3$/mcm, and P6$_3$/mmc.

The monoclinic crystal structure belongs to any one of the space groups selected from the group consisting of P2, P2$_1$, C2, Pm, Pc, Cm, Cc, P2/m, P2$_1$/m, C2/m, P2/c, P2$_1$/c, and C2/c.

Among the aforementioned crystal structures, for increasing the discharge capacity of the obtained lithium secondary cell, the especially preferable crystal structure of the lithium metal composite oxide is a hexagonal crystal structure belonging to R-3m or a monoclinic crystal structure belonging to C2/m.

The space group of the lithium metal composite oxide in the present embodiment can be confirmed by the following method.

First, the powder X-ray diffraction measurement is performed with respect to the lithium metal composite oxide, wherein Cu-Kα is used as a radiation source and the measurement range of a diffraction angle 2θ is set in a range of 10° to 90°. Then, Rietveld analysis is performed on the basis of the result (the obtained powder X-ray diffraction pattern), and the crystal structure possessed by the lithium metal composite oxide and the space group in the crystal structure are determined. The Rietveld analysis is a method in which the crystal structure of a material is analyzed using the data of diffraction peaks (diffraction peak intensity and diffraction angle 2θ) in the powder X-ray diffraction measurement of the material, which has been conventionally used (see, for example, "Practice of powder X-ray analysis-Introduction to the Rietveld method" published on Feb. 10, 2002, and edited by Conference for X-ray analysis in The Japan Society for Analytical Chemistry).

(Particle Diameter)

As to the form of particles of the positive electrode active material for a lithium secondary cell of the present invention, the positive electrode active material includes secondary particles formed by aggregation of primary particles, and may be in the form of a mixture of primary particles and secondary particles formed by aggregation of primary particles.

In the present invention, the primary particle diameter of the positive electrode active material is preferably 0.1 μm or more and 1 μm or less.

The average primary particle diameter can be measured by the SEM observation.

Requirement (2): Secondary Particle Diameter of Positive Electrode Active Material In the present embodiment, the diameter of the secondary particles formed by aggregation of primary particles is 2 μm or more and 10 μm or less.

The lower limit of the secondary particle diameter is preferably 2.5 μm, and more preferably 3 μm. The upper limit of the secondary particle diameter is preferably 8 μm, more preferably 7 μm, and still more preferably 6 μm. The upper limit values and lower limit values of the secondary particle diameter can be arbitrarily combined. As the combination of the upper limit values and lower limit values of the secondary particle diameter, the secondary particle diameter is preferably 2.5 μm or more and 7 μm or less, and more preferably 3.5 μm or more and 5.0 μm or less.

The secondary particle diameter within the above range can prevent crushing of the particles of the positive electrode active material when the positive electrode active material is pressurized and prevent the positive electrode active material powder from adhering to a roll or the like at the time of pressurization.

In the present embodiment, the "secondary particle diameter" of the positive electrode active material for a lithium secondary cell indicates a value measured by the following method (laser diffraction scattering method).

First, 0.1 g of a powder of the positive electrode active material for a lithium secondary cell is added to 50 ml of 0.2 wt % aqueous solution of sodium hexametaphosphate, thereby obtaining a dispersion with the powder dispersed therein. The obtained dispersion is subjected to a particle size distribution measurement using a laser scattering particle size distribution measuring apparatus (Mastersizer MS2000, manufactured by Malvern Instruments Ltd.), whereby the volume-based particle size distribution is measured. From the obtained cumulative particle size distribution curve, the particle diameter ($D_{50}$) at a 50% cumulation measured from the smallest particle side is determined as the secondary particle diameter of the positive electrode active material for a lithium secondary cell.

Requirement (3): Pore Diameter Distribution Determined by Mercury Porosimetry

The positive electrode active material for a lithium secondary cell in the first aspect of the present invention has a maximum peak value in a pore diameter range of 90 nm to 150 nm in a pore diameter distribution determined by mercury porosimetry.

When the pore diameter is not more than the above upper limit value, the positive electrode active material can be used to produce an electrode with a high packing ratio. As a result, the crushing of the particles of positive electrode active material can be prevented.

When the pore diameter is not less than the above lower limit value, the contact interface between the positive electrode active material and the electrolytic solution does not decrease, and the cell resistance decreases, whereby high output performance can be maintained.

For further enhancing the effect of the present invention, the upper limit of pore diameter range at which the maximum peak value is observed is preferably 145 nm, and more preferably 140 nm. The lower limit of pore diameter range at which the maximum peak value is observed is preferably 95 nm, and more preferably 100 nm. The upper limit values and lower limit values of the pore diameter range can be arbitrarily combined.

From the viewpoint of improving the output performance of the lithium secondary cell using the positive electrode active material for a lithium secondary cell of the present invention, it is preferable that the pore volume of pores having diameters in the range of 10 nm to 200 nm is 0.025 cm$^3$/g or more and 0.045 cm$^3$/g or less. The upper limit of pore volume of pores having diameters in the above range is more preferably 0.0425 cm$^3$/g, and still more preferably 0.040 cm$^3$/g. The lower limit of pore volume of pores having diameters in the above range is more preferably 0.0275 cm$^3$/g, and still more preferably 0.030 cm$^3$/g. The upper limit values and lower limit values of the pore volume can be arbitrarily combined.

In the present embodiment, the pore diameter of the positive electrode active material can be determined by the following method.

First, a vessel in which a sample has been placed is evacuated to a vacuum, and the inside of this vessel is thereafter filled with mercury. Since mercury has a high surface tension, no mercury intrudes into the surface pores of the sample when the system is allowed to remain as it is. However, when a pressure is applied to the mercury and the pressure is gradually elevated, the pores undergo gradual mercury intrusion thereinto in descending order of pore diameter. By detecting the change of the amount of mercury intruded into pores while continuously elevating the pressure, a mercury intrusion curve which indicates a relationship between the pressure applied to the mercury and the amount of mercury intruded is obtained. When the shape of a pore is assumed to be cylindrical, the pressure applied to mercury is expressed as P, the diameter of the pore (pore diameter) is expressed as D, the surface tension of mercury is expressed as δ, and the contact angle of mercury with the sample is expressed as θ, the pore diameter can be expressed by the following equation.

$$D = -4\sigma \times \cos \theta / P \quad (A)$$

That is, since there is a correlation between the pressure P applied to the mercury and the diameter D of the pore into which the mercury intrudes, a pore distribution curve which shows a relationship between the pore radii of the sample and the volume of the pores can be obtained based on the mercury intrusion curve obtained. Regarding approximate measuring limits in pore diameter measurements by the mercury porosimetry, the lower limit is about 2 nm or larger, and the upper limit is about 200 μm or less. A measurement by the mercury porosimetry can be made using an apparatus such as a mercury porosimeter. Specific examples of the mercury porosimeter include AutoPore 1119420, manufactured by Micromeritics Instrument Corp.

(BET Specific Surface Area)

The BET specific surface area of the positive electrode active material of the present embodiment is preferably 1.5 m$^2$/g or more and 2.5 m$^2$/g or less. The BET specific surface area within the above range can more surely prevent crushing of the particles of the positive electrode active material when the positive electrode active material is pressurized.

The BET specific surface area of the lithium metal composite oxide is preferably 1.6 m$^2$/g or more, more preferably 1.7 m$^2$/g or more, and still more preferably 1.8 m$^2$/g or more. Further, for effective filling, the BET specific surface area is preferably 2.45 m$^2$/g or less, more preferably 2.4 m$^2$/g or less, and still more preferably 2.3 m$^2$/g or less. The upper limit values and lower limit values of the BET specific surface area can be arbitrarily combined.

The BET specific surface area of the lithium metal composite oxide within the above range can more surely prevent crushing of the particles of the positive electrode active material when the positive electrode active material is pressurized.

(Crystallite Size)

The lithium metal composite oxide has a crystallite size of 100 Å to 1200 Å within a peak region of 2θ=18.7±1° (hereinafter, also referred to as "peak A") and a crystallite size of 100 Å to 800 Å within a peak region of 2θ=44.6±10 (hereinafter, also referred to as "peak B"), each determined by a powder X-ray diffraction measurement using Cu-Kα ray. The upper limit of the crystallite size at peak A is preferably 1100 Å, more preferably 1000 Å, and still more preferably 950 Å. The lower limit of the crystallite size at peak A is preferably 400 Å, more preferably 500 Å, and still more preferably 600 Å. The upper limit of the crystallite size at peak B is preferably 750 Å, more preferably 700 Å, and still more preferably 650 Å. The lower limit of the crystallite size at peak B is preferably 300 Å, more preferably 400 Å, and still more preferably 500 Å. The upper limit values and lower limit values of the crystallite sizes at peak A and peak B can be arbitrarily combined. By this feature, the cycle performance of the lithium secondary cell can be improved.

In the present embodiment, the crystallite sizes at the peak A and the peak B can be confirmed as follows.

First, the powder X-ray diffraction measurement is performed with respect to the positive electrode active material, wherein Cu-Kα is used as a radiation source and the measurement range of a diffraction angle 2θ is set in a range of 10° to 90°, to thereby determine peaks corresponding to the peak A and the peak B. Then, the half width values of the determined peaks are calculated, from which the crystal sizes are calculated by Scherrer equation: D=Kλ/B cos θ (D: crystallite size, K: Scherrer constant, Bs: peak line width). The determination of crystallite size by the aforementioned formula is a technique that has been conventionally used for this purpose (see, for example, "X-ray structural analysis—determination of arrangement of atoms—", third edition issued Apr. 30, 2002, Yoshio Waseda, Eiichiro Matsubara).

(Void within Secondary Particles)

Further, the positive electrode active material of the present embodiment preferably contains particles having voids inside the secondary particles. The "void" refers to a space having a diameter of 50 nm or more present within the positive electrode active material particle when the cross section thereof is observed. It is preferable that the number of voids in one particle is preferably two or more, more preferably five or more, and still more preferably ten or more. The presence of voids can increase the discharge capacity in discharge of the obtained lithium secondary cell at a high current rate. The diameter of the voids is preferably in the range of 60 nm to 1000 nm, more preferably 70 nm to 800 nm or less, further preferably 75 nm to 600 nm. When the diameter of the voids is within the above range, the density of the electrode using the positive electrode active material particles is increased, and a high capacity lithium secondary cell can be obtained.

Specific examples of the method for measuring the void diameter include the following measuring method.

The positive electrode active material particles to be measured are dispersed in an epoxy resin and solidified. This epoxy resin is subjected to cross-section processing by an Ar ion milling method using Ilion manufactured by Gatan Inc. and a SEM observation is carried out on the processed sample by irradiating an electron beam at an accelerating voltage of 2 kV using S-4800 manufactured by Hitachi High-Technologies Corporation. A particle is selected at random from an image (SEM image) obtained by SEM observation, parallel lines were drawn from a certain direction so as to sandwich the projection image of a space inside the particle, and the distance between the parallel lines (Feret diameter) is measured as the diameter of the space. When the diameter is not less than 50 nm, the space is regarded as a void.

Further, the ratio of the secondary particles having voids inside thereof in the positive electrode active material of the present embodiment is preferably 20% or more, more preferably 50% or more, and further preferably 80% or more. The ratio of the secondary particles having voids inside thereof is, for example, defined as 20% or more when 20 or more secondary particles having voids inside thereof are included with respect to 100 secondary particles. The presence of such secondary particles in this ratio increases a liquid retention amount of an electrode using the positive electrode active material particles, whereby a lithium secondary cell having a high cycle performance can be obtained.

(Tapped Bulk Density of Positive Electrode Active Material)

In the present embodiment, for obtaining a lithium secondary cell with higher electrode density, the tapped bulk density of the positive electrode active material for a lithium secondary cell is preferably 1.20 g/mL or more, more preferably 1.25 g/mL or more, still more preferably 1.30 g/mL or more. Further, for obtaining an electrode with improved impregnation with an electrolytic liquid, the tapped bulk density is preferably 1.80 g/mL or less, more preferably 1.65 g/mL or less, and still more preferably 1.50 g/mL or less.

The tapped bulk density can be measured in accordance with JIS R 1628-1997.

In the present specification, the tamped density corresponds to tapped density measured in accordance with the method prescribed in JIS R 1628-1997.

(Pore Volume of Positive Electrode Active Material/(1/Tapped Bulk Density))

Furthermore, from the viewpoint of suppressing cracking or crushing of the positive electrode active material used in an electrode, the positive electrode active material for a lithium secondary cell of the present embodiment preferably has pores of small pore diameter in a specific amount (volume). Specifically, when the total volume of the voids present inside the secondary particles and the gaps formed between the secondary particles is expressed as Vc (Vc (mL/g)=1/(tapped bulk density)), and the sum of the pore volumes of pores having diameters in the range of 100 nm to 100 nm in the pore distribution measurement is expressed as Vs (mL/g), the ratio of Vs to Vc (Vs/Vc×100) is preferably 4.0% or less, more preferably 3.5% or less, and still more preferably 3.3% or less. Further, for obtaining a positive electrode active material with improved impregnation with an electrolytic liquid, the ratio is preferably 1.0% or more, more preferably 1.5% or more, and still more preferably 1.7% or more.

The positive electrode active material having a configuration as described above uses the aforementioned lithium metal composite oxide, whereby the crushing of the particles of the positive electrode active material can be prevented. Therefore, it is possible to prevent the adhesion of the positive electrode active material powder generated by the pressurization, so that good working efficiency can be ensured.

In addition, the positive electrode active material having a configuration as described above enables a cell using the positive electrode active material to exhibit cell resistance superior to conventional cells.

[Method for Producing Lithium Metal Composite Oxide]

In producing the lithium metal composite oxide of the present invention, it is preferred that a metal composite compound is first prepared, which includes an essential metal(s) other than lithium, i.e., at least one metal selected from the group consisting of Ni, Co and Mn, and at least one optional metal selected from Fe, Cu, Ti, Mg, Al, W, Zn, Sn, Zr, Ga and V, and then the metal composite compound is baked with a suitable lithium salt. As the metal composite compound, it is preferable to use a metal composite hydroxide or a metal composite oxide. Hereinbelow, as to one example of the method for producing the positive electrode active material, explanations are made separately on the step of producing the metal composite compound and the step of producing the lithium metal composite oxide.

(Step of Producing Metal Composite Compound)

The metal composite compound can be produced by the conventionally known method. Hereinbelow, the method for producing the metal composite compound is explained taking as an example the case of production of a metal composite hydroxide containing nickel, cobalt and manganese as metals.

First, a nickel salt solution, a cobalt salt solution, a manganese salt solution and a complexing agent are reacted by the co-precipitation method, especially, a continuous method described in Japanese Patent Unexamined Publication No. 2002-201028 to produce a metal composite hydroxide represented by $Ni_xCo_yMn_z(OH)_2$, wherein x+y+z=1.

There is no particular limitation with respect to a nickel salt as a solute in the aforementioned nickel salt solution. For example, any of nickel sulfate, nickel nitrate, nickel chloride and nickel acetate can be used. As a cobalt salt as a solute in the cobalt salt solution, for example, any of cobalt sulfate, cobalt nitrate and cobalt chloride can be used. As a manganese salt as a solute in the manganese salt solution, for example, any of manganese sulfate, manganese nitrate and manganese chloride can be used. These metal salts are used in a ratio corresponding to the composition ratio of the aforementioned $Ni_xCo_yMn_z(OH)_2$. As a solvent, water can be used.

The complexing agent is a substance capable of forming a complex with ions of nickel, cobalt and manganese in an aqueous solution, the examples of which include an ammonium ion donor (ammonium sulfate, ammonium chloride, ammonium carbonate, ammonium fluoride, etc.), hydrazine, ethylenediaminetetraacetic acid, nitrilotriacetic acid, uracil diacetate and glycine.

For adjusting the pH value of the aqueous solution during the precipitation, if necessary, an alkali metal hydroxide (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of $Ni_xCo_yMn_z(OH)_2$. The reaction is performed with the temperature in the reaction vessel being regulated, for example, within the range of 10° C. to 60° C., preferably 20° C. to 60° C. and the pH value in the reaction vessel being regulated, for example, within the range of 9 to 13, preferably 11 to 13, while appropriately agitating the content of the reaction vessel. With respect to the reaction vessel, one which allows the overflow for separation of the precipitated reaction product can be used.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting may be washed with weak acid water. In the above example, a nickel-cobalt-manganese composite hydroxide is produced; however, a nickel-cobalt-manganese composite oxide may be produced instead.

With respect to various properties of the lithium metal composite oxide to be finally obtained as a result of carrying out the process as described below, i.e., primary particle diameter, secondary particle diameter, crystallite size, and BET specific surface area, such properties can be adjusted by appropriately controlling the concentrations of the metal salts to be supplied to the reaction vessel, agitation speed, reaction temperature, reaction pH, and calcination conditions described below, and the like. Further, for realizing desired pore distribution and voids, a bubbling with various gases such as inert gases (e.g., nitrogen, argon and carbon dioxide), air and oxygen may be carried out as well in addition to the control of the aforementioned conditions. The reaction conditions can be optimized while monitoring the various physical properties of the final lithium metal composite oxide to be obtained since the optimal reaction conditions may vary depending on the size of the reaction vessel used, etc.

(Method for Producing Lithium Metal Composite Oxide)

After drying the metal composite oxide or the metal composite hydroxide, the dried product is mixed with a lithium salt. The drying conditions are not particularly limited, and may be, for example, any of the following conditions: conditions under which the metal composite oxide or the metal composite hydroxide is not oxidized nor reduced (oxide→oxide, hydroxide→hydroxide), conditions under which the metal composite hydroxide is oxidized (hydroxide→oxide), and conditions under which the metal composite oxide is reduced (oxide→hydroxide). For providing conditions which do not cause oxidation nor reduction, it is possible to use an inert gas such as nitrogen or a noble gas (e.g., helium and argon). For providing conditions which oxidize the metal composite hydroxide, the drying may be carried out in an atmosphere of oxygen or air. Further, for providing conditions which reduce the metal composite oxide, a reducing agent such as hydrazine or sodium sulfite may be used in an inert gas atmosphere. As the lithium salt, any of lithium carbonate, lithium nitrate, lithium acetate, lithium hydroxide, lithium hydroxide hydrate and lithium oxide may be used individually or in the form of a mixture of two or more of these lithium salts.

After drying the metal composite oxide or the metal composite hydroxide, the resulting may be subjected to appropriate classification. The aforementioned lithium salt and the metal composite hydroxide are used in respective amounts determined in view of the composition ratio of the end product. For example, when using a nickel-cobalt-manganese composite hydroxide, the lithium salt and the metal composite hydroxide are used in a ratio corresponding to the composition ratio of $LiNi_xCo_yMn_zO_2$ (wherein, x+y+z=1). By calcining a mixture of the nickel-cobalt-manganese composite hydroxide and the lithium salts, a lithium-nickel-cobalt-manganese composite oxide can be obtained. The calcination may be carried out in dried air, an oxygen atmosphere, an inert atmosphere or the like depending on the desired composition, and may include a plurality of heating steps if necessary.

The temperature for calcination of the aforementioned metal composite oxide or metal composite hydroxide and lithium compounds such as lithium hydroxide or lithium carbonate is not particularly limited, but is preferably 850° C. or more and 1100° C. or less, more preferably 850° C. or more and 1050° C. or less, and most preferably 850° C. or more and 1025° C. or less. When the calcination temperature is below 850° C., it is likely to cause a drawback that an energy density (discharge capacity) and a high rate discharge performance decrease. This may be attributable to a structural factor disturbing the movement of Li, which is inherently caused by the calcination at a temperature below the temperature region.

On the other hand, a calcination temperature exceeding 1100° C. is likely to cause problems related to production process such as difficulty in obtaining a composite oxide having a desired composition due to volatilization of Li and a problem of deterioration of the cell performance due to increased density of the particles. This is due to the fact that, at a temperature exceeding 1100° C., a primary particle growth rate increases and a crystal particle of the composite oxide becomes too large. In addition, another cause of the problem is considered to reside in that the quantity of Li loss locally increases to cause the structural unstability. Furthermore, as the temperature becomes higher, an elemental substitution between sites occupied by a Li element and sites occupied by transition metal elements occurs to an extremely high extent, and the discharge capacity decreases due to inhibition of Li conduction path. With the calcination temperature being in a range of 850° C. to 1025° C., a cell having a particularly high energy density (discharge capacity) and an improved charge/discharge cycle performance can be manufactured. The calcination time is preferably 3 hours to 50 hours. The calcination time exceeding 50 hours does not harm the manufacturing process of the cell, but tends to result in substantially lower cell performance due to volatilization of Li. The calcination time less than 3 hours tends to result in a poor crystal growth and an inferior cell performance. It is also effective to perform a precalcination in advance of the aforementioned calcination. Such a precalcination is preferably performed at a temperature in the range of 300 to 850° C. for 1 to 10 hours.

The lithium metal composite oxide after the calcination is pulverized and then appropriately classified, thereby obtaining the positive electrode active material applicable to a lithium secondary cell.

[Positive Electrode for Lithium Secondary Cell, and Lithium Secondary Cell]

Next, explanations are made below on a positive electrode (for a lithium secondary cell) according to the second aspect of the present invention, which uses the aforementioned lithium metal composite oxide as a positive electrode active material, and a lithium secondary cell according to the third aspect of the present invention, which includes the positive electrode, while explaining the configuration of the lithium secondary cell.

An example of the lithium secondary cell of the present embodiment includes a positive electrode, a negative electrode, a separator sandwiched between the positive electrode and the negative electrode, and an electrolytic solution disposed between the positive electrode and the negative electrode.

FIG. 1 is a schematic view illustrating an example of the lithium secondary battery of the present embodiment. A cylindrical lithium secondary battery 10 of the present embodiment is manufactured as described below.

First, as illustrated in FIG. 1(a), a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound to obtain an electrode group 4.

Next, as illustrated in FIG. 1(b), the electrode group 4 and an insulator (not shown) are put in a battery can 5, then, the bottom of the can is sealed, an electrolytic solution 6 is impregnated into the electrode group 4, and an electrolyte is disposed between the positive electrode 2 and the negative electrode 3. Furthermore, the top section of the battery can 5 is sealed using a top insulator 7 and a sealing body 8, whereby the lithium secondary battery 10 can be obtained.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape, etc.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type cell, button-type cell, and paper-type (or sheet-type) cell.

Hereinafter, the respective components will be described.
(Positive Electrode)

The positive electrode of the present embodiment can be manufactured by, first, preparing a positive electrode mix including the aforementioned positive electrode active material, a conductive material and a binder, and causing the positive electrode mix to be supported on a positive electrode current collector.
(Conductive Material)

As the conductive material included in the positive electrode active material of the present embodiment, a carbonaceous material can be used. Examples of the carbonaceous material include a graphite powder, a carbon black (such as acetylene black) and a fibrous carbonaceous material. Since carbon black is a microparticle and has a large surface area, the addition of only a small amount of the carbon black to the positive electrode mix increases the conductivity within the positive electrode, and improves the charge and discharge efficiency and the output performance as well; however, too large an amount of carbon black deteriorates the binding strength of the binder exerted not only between the positive electrode mix and the positive electrode current collector but also within the positive electrode mix, resulting in an adverse factor that increases an internal resistance.

The amount of the conductive material in the positive electrode mix is preferably 5 parts by mass or more and 20 parts by mass or less, relative to 100 parts by mass of the positive electrode active material for a lithium secondary cell. This amount may be decreased when using a fibrous carbonaceous material such as a graphitized carbon fiber or a carbon nanotube as the conductive material.
(Binder)

As the binder included in the positive electrode active material of the present embodiment, a thermoplastic resin can be used.

Examples of the thermoplastic resin include fluororesins such as polyvinylidene fluoride (hereinafter, in some cases, referred to as PVdF), polytetrafluoroethylene (hereinafter, in some cases, referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as binders, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.
(Positive Electrode Current Collector)

As the positive electrode current collector included in the positive electrode of the present embodiment, it is possible to use a strip-shaped member composed of a metal material such as Al, Ni, or stainless steel as a component material. It is especially preferred to use a current collector which is made of Al and is shaped into a thin film because of its low cost.

Examples of the method for causing the positive electrode mix to be supported on the positive electrode current collector include a method in which the positive electrode mix is press-formed on the positive electrode current collector.

In the present embodiment, since the aforementioned lithium metal composite oxide is used as a positive electrode active material for a lithium secondary cell, the crushing of the particles of the positive electrode active material can be prevented during this press-forming.

Consequently, it becomes possible to prevent the positive electrode active material powder generated by breakage of the positive electrode active material from adhering to a roll or the like used for pressurization.

Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.

(Negative Electrode)

The negative electrode included in the lithium secondary cell of the present embodiment is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and $SiO$; oxides of titanium represented by the formula: $TiO_x$ (wherein x is an positive integer) such as $TiO_2$ and $TiO$; oxides of vanadium represented by the formula: $VO_x$ (wherein x is an positive integer) such as $V_2O_5$ and $VO_2$; oxides of iron represented by the formula: $FeO_x$ (wherein x is an positive integer) such as $Fe_3O_4$, $Fe_2O_3$ and $FeO$; oxides of tin represented by the formula: $SnO_x$ (wherein x is an positive integer) such as $SnO_2$ and $SnO$; oxides of tungsten represented by the formula: $WO_x$ (wherein x is an positive integer) such as $WO_3$ and $WO_2$; and metal composite oxides containing lithium and titanium or vanadium such as $Li_4Ti_5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and $TiS$; sulfides of vanadium represented by the formula: $VS_x$ (wherein x is an positive integer) such as $V_3S_4$, $VS_2$, and $VS$; sulfides of iron represented by the formula: $FeS_x$ (wherein x is an positive integer) such as $Fe_3S_4$, $FeS_2$ and $FeS$; sulfides of molybdenum represented by the formula: $MoS_x$ (wherein x is an positive integer) such as $Mo_2S_3$ and $MoS_2$; sulfides of tin represented by the formula: $SnS_x$ (wherein x is an positive integer) such as $SnS_2$ and $SnS$; sulfides of tungsten represented by the formula: $WS_x$ (wherein x is an positive integer) such as $WS_2$; sulfides of antimony represented by the formula: $SbS_x$ (wherein x is an positive integer) such as $Sb_2S_3$; and sulfides of selenium represented by the formula: $SeS_x$ (wherein x is an positive integer) such as $Se_5S_3$, $SeS_2$ and $SeS$.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, and tin metals.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode materials, carbonaceous materials composed mainly of graphite such as natural graphite or artificial graphite are preferably used for the following reasons: the potential of the negative electrode hardly changes during charging from a uncharged state to a fully charged state (the potential flatness is favorable), the average discharge potential is lower, the capacity maintenance ratio after repeated charge/discharge cycles is higher (the cycle performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and specific examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press bonded to the current collector.

(Separator)

As the separator used in the lithium secondary cell of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

Examples of the separator include separators described in Japanese Unexamined Patent Application Publication No. 2000-30686 and Japanese Unexamined Patent Application Publication No. Hei10-324758. In order to increase the volumetric energy density of the cell and to decrease the internal resistance, the thickness of the separator is preferred to be as small as possible, as long as a sufficient mechanical strength can be secured. The thickness is preferably about 5 to 200 μm, more preferably about 5 to 40 μm.

The separator preferably has a porous film including a thermoplastic resin. In a lithium secondary cell, when an abnormal current flows in the cell due to short circuit, etc., between the positive and negative electrodes, it is preferable to block the current at the short-circuited point to prevent (shut down) the passage of an excessively large current. The shut down is executed when the separator at the short-circuited point is overheated due to short circuit and the working temperature exceeds a preset threshold, which causes the porous film in the separator to soften or melt to block the micropores of the film. It is desirable that the separator maintains a shutdown state without the rupture of the film, even if the temperature in the cell increases to a certain elevated temperature after the shut down.

Such a separator may be a laminated film in which a heat resistant porous layer and a porous film are laminated. By using such a laminated film as a separator, the heat resistance of the secondary cell in the present embodiment can be further improved. As for the laminated film, the heat resistant porous layer may be laminated on both sides of the porous film.

(Laminated Film)

An explanation is made below about the laminated film in which the heat resistant porous layer and porous film are laminated one upon the other.

In the laminated film used as a separator of the lithium secondary cell of the present embodiment, the heat resistant porous layer is a layer having a heat resistance higher than that of the porous film. The heat resistant porous layer may be formed of an inorganic powder (a first heat resistant porous layer), may be formed of a heat resistant resin (a second heat resistant porous layer), or may be formed to include a heat resistant resin and a filler (a third heat resistant porous layer). The heat resistant resin in the heat resistant porous layer enables the heat resistant porous layer to be formed by a simple technique such as coating.

(First Heat Resistant Porous Layer)

When the heat resistant porous layer is formed of inorganic powder, examples of the inorganic powder used for the heat resistant porous layer includes powders composed of inorganic substances such as metal oxide, metal nitride, metal carbide, metal hydroxide, carbonate and sulfate, among which a powder composed of an (insulating) inorganic substance having a low conductivity is preferably used. Specific examples include powders composed of alumina, silica, titanium dioxide, and calcium carbonate. Each of such inorganic powders may be used either alone or as a mixture of two or more thereof.

Because of its high chemical stability, alumina powder is preferable among the aforementioned inorganic powders.

Also, it is more preferable that all particles constituting the inorganic powder are alumina particles, and it is further preferable that all particles constituting the inorganic powder are alumina particles, a part or all of which are approximately spherical alumina particles.

(Second Heat Resistant Porous Layer)

When the heat resistant porous layer is formed of a heat resistant resin, examples of the heat resistant resin used for the heat resistant porous layer include polyamide, polyimide, polyamide-imide, polycarbonate, polyacetal, polysulfone, polyphenylene sulfide, polyether ketone, aromatic polyester, polyethersulfone and polyetherimide. For further improving the heat resistance of the laminated film, polyamide, polyimide, polyamide-imide, polyethersulfone and polyetherimide are preferable, and polyamide, polyimide and polyamide-imide are more preferable.

The heat resistant resin used for the heat resistant porous layer is more preferably a nitrogen-containing aromatic polymer such as aromatic polyamide (para-oriented aromatic polyamide or meta-oriented aromatic polyamide), aromatic polyimide, aromatic polyamide-imide, of which aromatic polyamide is preferable. From the viewpoint of ease in production, especially preferable is para-oriented aromatic polyamide (hereinafter also referred to as para-aramid).

Further examples of the heat resistant resin include poly-4-methylpentene-1 and cyclic olefin polymers.

The aforementioned heat resistant resin can further improve the heat resistance of a laminated film used as a separator of the lithium secondary cell, or can further elevate the thermal breakage temperature of the laminated film. Regarding these heat resistant resins, the use of the nitrogen-containing aromatic copolymer may exhibit an improved compatibility with the electrolytic solution, namely an improved liquid retention in the heat resistant porous layer, possibly because of the polarity in the molecules of the nitrogen-containing aromatic copolymer. In such a case, the impregnation of the electrolytic solution proceeds more rapidly in the production of the lithium secondary cell, and the discharge and charge capacity of the lithium secondary cell further increases.

The thermal breakage temperature of such a laminated film depends on the type of heat resistant resin, and is set depending on the condition and purpose of use. More specifically, the thermal breakage temperature may be controlled to be around 400° C. when the aforementioned nitrogen-containing aromatic copolymer is used as the heat resistant resin, around 250° C. for the poly-4-methylpentene-1, and around 300° C. for the cyclic olefin polymer. Also, when the heat resistant porous layer is formed of an inorganic powder, the thermal breakage temperature can be controlled to be, for example, 500° C. or higher.

The para-aramid is obtained by condensation polymerization of a para-oriented aromatic diamine and a para-oriented aromatic dicarboxylic acid halide, and substantially composed of repeating units which are bonded through amide bonds in a para-direction of the aromatic rings or in an equivalent direction (e.g., a direction extending coaxially or in parallel in opposite directions as in the case of 4,4'-biphenylene, 1,5-naphthalene, 2,6-naphthalene, etc.). Specific examples include para-aramids having a para-oriented structure or an equivalent structure, such as poly(paraphenyleneterephthalamide), poly(parabenzamide), poly(4,4'-benzanilideterephthalamide), poly(paraphenylene-4,4'-biphenylenedicarboxylic acid amide), poly(para-phenylene-2,6-naphthalenedicarboxylic acid amide), poly(2-chloro-paraphenylene terephthalamide), and paraphenyleneterephthalamide/2,6-dichloroparaphenyleneterephthalamide copolymer.

The aromatic polyimide is preferably a fully aromatic polyimide produced by condensation polymerization of an aromatic dianhydride and a diamine.

Specific examples of the aromatic dianhydride used for condensation polymerization include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl) hexafluoropropane and 3,3',4,4'-biphenyltetracarboxylic dianhydride.

Specific examples of the diamine used for condensation polymerization include oxydianiline, paraphenylendiamine, benzophenone diamine, 3,3'-methylenedianiline, 3,3'-diaminobenzophenone, 3,3'-diaminodiphenyl sulfone and 1,5-naphthalenediamine.

As the aromatic polyimide, a polyimide that is soluble to a solvent can be suitably used. Examples of the polyimide include a polyimide which is a polycondensate of 3,3',4,4'-diphenylsulfone tetracarboxylic dianhydride and an aromatic diamine.

Examples of the aforementioned aromatic polyamideimide include an aromatic polyamideimide obtained by condensation polymerization of an aromatic dicarboxylic acid and an aromatic diisocyanate, and an aromatic polyamideimide obtained by condensation polymerization of an aromatic diacid anhydride and an aromatic diisocyanate. Specific examples of the aromatic dicarboxylic acid include isophthalic acid and terephthalic acid. Specific examples of the aromatic diacid anhydride include anhydrous trimellitic acid. Specific examples of the aromatic diisocyanate include 4,4'-diphenylmethane diisocyanate, 2,4-tolylene diisocyanate, 2,6-tolylene diisocyanate, ortho-tolylene diisocyanate and m-xylene diisocyanate.

For further improving the ion permeability, the heat resistant porous layer of the laminated film is preferably a thin layer having a thickness of 1 μm or more and 10 μm or less, more preferably 1 μm or more and 5 μm or less, and especially preferably 1 μm or more and 4 μm or less. Also, the heat resistant porous layer has micropores, and the size (diameter) of the pores is preferably 3 μm or less, and more preferably 1 μm or less.

(Third Heat Resistant Porous Layer)

When the heat resistant porous layer includes a heat resistant resin and a filler, the heat resistant resin may be the same as the one used for the above-mentioned second heat resistant porous layer. The filler may be one or more selected from the group consisting of organic powder, inorganic powder and a mixture thereof. It is preferable that particles constituting the filler has an average particle size of 0.01 μm or more and 1 μm or less.

Examples of the organic powder which can be used as a filler include powders of organic materials such as a homopolymer of or a copolymer including two or more of styrene, vinyl ketone, acrylonitrile, methyl methacrylate, ethyl methacrylate, glycidyl methacrylate, glycidyl acrylate or methyl acrylate; a fluoro resin such as PTFE, ethylene tetrafluoride-propylene hexafluoride copolymer, ethylene tetrafluoride-ethylene copolymer, or polyvinylidene fluoride; melamine resin; urea resin; polyolefin resin; and polymethacrylate. Each of such organic powders may be used alone or as a mixture of two or more thereof. Among these organic powders, PTFE powder is preferable because of a high chemical stability.

Examples of the inorganic powder which can be used as a filler include the same powders as mentioned above as the inorganic powders used for the heat resistant porous layer.

When the heat resistant porous layer includes the heat resistant resin and the filler, an appropriate amount of the filler varies depending on relative density of the material of the filler. However, for example, when all of the particles constituting the filler are alumina particles, the amount of the filler is preferably 5 parts by mass or more and 95 parts by mass or less, more preferably 20 parts by mass or more and 95 parts by mass or less, and further preferably 30 parts by mass or more and 90 parts by mass or less, relative to 100 parts by mass of the heat resistant porous layer. These ranges can be set as appropriate depending on the relative density of the material of the filler.

Examples of the shape of the filler include an approximately spherical shape, a planar shape, a columnar shape, a needle shape, and a fibrous shape. The filler may be particles of any of these shapes, but is preferably in the form of approximately spherical particles because uniform pores can be formed easily. The approximately spherical particles may be, for example, particles having an aspect ratio (major axis/minor axis) of 1 or more and 1.5 or less. The aspect ratio of the particles can be determined using an electron photomicrograph.

Preferably, the porous film in the laminated film used as the separator of the lithium secondary cell of the present embodiment has micropores and has a shutdown function. In this case, the porous film contains a thermoplastic resin.

The micropores in the porous film have a size of preferably 3 Lm or less, and more preferably 1 Lm or less. The porosity of the porous film is preferably 30% by volume or more and 80 by volume or less, and more preferably 40% by volume or more and 70% by volume or less. In the lithium secondary cell, when the working temperature exceeds the preset threshold, the porous film containing the thermoplastic resin is allowed to close the micropores as a result of the softening or fusing of the thermoplastic resin included in the porous film.

The thermoplastic resin used for the porous film is not particularly limited as long as it does not dissolve in the electrolytic liquid used in the lithium secondary cell.

Specific examples of the thermoplastic resin include polyolefin resins such as polyethylene and polypropylene, and thermoplastic polyurethane resins, and two or more of these resins may be used in the form of a mixture thereof.

In order to cause the separator to soften and shut down at a lower temperature, it is preferable that the porous film contains polyethylene. Examples of the polyethylene include a low density polyethylene, a high density polyethylene, and a linear polyethylene. An ultra-high-molecular-weight polyethylene having a molecular weight of 1,000,000 or more may also be used.

In order to further improve a puncture strength of the porous film, it is preferable that the thermoplastic resin included in the porous film contains at least the ultra-high-molecular-weight polyethylene. In manufacturing the porous film, it is preferable in some cases that the thermoplastic resin contains wax composed of polyolefin having a low molecular weight (weight average molecular weight of 10,000 or less).

Further, the porous film in the laminated film has a thickness of preferably 3 μm or more and 30 μm or less, and more preferably 3 μm or more and 25 μm or less. Also, in the present embodiment, the laminated film has a thickness of preferably 40 μm or less, and more preferably 30 μm or less. When the thickness of the heat resistant porous layer is A (μm) and the thickness of the porous film is B (μm), it is preferable that the value of A/B is 0.1 or more and 1 or less.

In the present embodiment, for satisfactory permeation of the electrolyte through the separator during the use (charge and discharge) of the cell, the separator preferably has an air resistance of 50 sec/100 cc or more and 300 sec/100 cc or less, more preferably 50 sec/100 cc or more and 200 sec/100 cc or less, as measured by Gurley method prescribed in JIS P 8117.

The porosity of the separator is preferably 30% by volume or more and 80 by volume or less, and more preferably 40% by volume or more and 70% by volume or less. The separator may be a laminate of separators having different porosities.

(Electrolytic Solution)

The electrolytic solution used in the lithium secondary cell of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein FSI means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and γ-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and an ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary cell, it is preferable to use an electrolytic solution including a lithium salt containing fluorine such as $LiPF_6$ and an organic solvent having a fluorine substituent. A solvent mixture including ether having a fluorine substituent such as pentafluoropropyl methyl ether or 2,2,3,3-tetrafluoropropyl difluoromethyl ether and dimethyl carbonate is more preferable since a high capacity retention is achievable even when the cell is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use what is called "gel-type" electrolyte including a polymer retaining therein a non-aqueous electrolytic solution. Further, it is also possible to use an inorganic solid electrolyte including a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$. Two or more of these inorganic solid electrolytes may be used in the form of a mixture thereof. In some cases, the use of such a solid electrolyte may further improve the safety of the lithium secondary cell.

In the lithium secondary cell of the present embodiment, the solid electrolyte, when used, may serve as a separator. In such a case, the separator may be omitted.

The positive electrode having a configuration as described above uses the aforementioned lithium metal composite oxide, whereby the crushing of the particles of the positive electrode active material can be prevented. Therefore, it is possible to prevent the adhesion of the positive electrode active material powder generated by the pressurization, so that good working efficiency can be ensured.

In addition, the positive electrode having a configuration as described above enables a cell using the positive electrode to exhibit cell resistance superior to conventional cells.

Furthermore, the lithium secondary cell having a configuration as described above uses the aforementioned positive electrode, whereby the crushing of the particles of the positive electrode active material can be prevented. Therefore, it is possible to prevent the adhesion of the positive electrode active material powder generated by the pressurization, so that good working efficiency can be ensured.

In addition, the lithium secondary cell exhibits cell resistance superior to conventional cells.

EXAMPLES

Hereinbelow, the present invention will be described with reference to Examples which, however, should not be construed as limiting the present invention.

In the Examples, the evaluation of a lithium metal composite oxide (positive electrode active material) and the evaluation of the manufacturing of a positive electrode and a lithium secondary battery were performed as follows.
(1) Evaluation of Positive Electrode Active Material for Lithium Secondary Cell
1. Composition Analysis of Positive Electrode Active Material for Lithium Secondary Cell The composition analysis of the lithium metal composite oxide manufactured by the method described below was carried out using an inductively coupled plasma emission spectrometer (SPS3000, manufactured by SII Nano Technology Inc.) after a sample powder of the lithium metal composite oxide was dissolved in hydrochloric acid.
2. Measurement of Primary Particle Diameter of Positive Electrode Active Material for Lithium Secondary Cell First, a sample powder of lithium metal composite oxide was placed on a conductive sheet attached onto a sample stage, and SEM observation was carried out by radiating an electron beam with an accelerated voltage of 20 kV using a JSM-5510 manufactured by JEOL Ltd. 50 primary particles were arbitrarily selected in an image (SEM photograph) obtained from the SEM observation, parallel lines were drawn from a certain direction so as to sandwich the projection image of each primary particle, and the distance between the parallel lines (Feret diameter) was measured as the particle diameter of the primary particle. The arithmetic average value of the obtained particle diameters is regarded as the average primary particle diameter of the lithium metal composite oxide.

3. Measurement of Primary Secondary Diameter of Positive Electrode Active Material for Lithium Secondary Cell First, 0.1 g of a powder of the lithium metal composite oxide was added to 50 ml of 0.2 wt % aqueous solution of sodium hexametaphosphate, thereby obtaining a dispersion with the powder dispersed therein. The obtained dispersion was subjected to a particle size distribution measurement using a laser scattering particle size distribution measuring apparatus (Mastersizer 2000, manufactured by Malvern Instruments Ltd.), whereby the volume-based particle size distribution curve was obtained. From the obtained cumulative particle size distribution curve, the particle diameter ($D_{50}$) at a 50% cumulation measured from the smallest particle side is determined as the average secondary particle diameter of the lithium metal composite oxide.

4. Measurement of Crystallite Size of Positive Electrode Active Material for Lithium Secondary Cell The powder X-ray diffraction analysis of the lithium metal composite oxide was carried out using an X-ray diffractometer (X'Pert PRO, manufactured by PANalytical). The obtained lithium metal composite oxide was charged onto a specially designed substrate, and the measurement was carried out using a Cu-Kα radiation source with a diffraction angle in the range of 2θ=10° to 90°, thereby obtaining a powder X-ray diffraction pattern. From the X-ray powder diffraction pattern, the half width value of the peak corresponding to the peak A and the half width value of the peak corresponding to the peak B were determined using a comprehensive X-ray powder diffraction pattern analyzing software JADES, from which the crystallite size was calculated by the Scherrer equation.

Peak A: 2θ=18.7±1°

Peak B: 2θ=44.6±1°

5. Pore Distribution Measurement of Positive Electrode Active Material for Lithium Secondary Cell by Mercury Porosimetry As a pretreatment, the lithium metal composite oxide was dried at a constant temperature of 120° C. for four hours. Using Auto Pore III9420 (manufactured by Micromeritics Instrument Corporation), the pore distribution measurement was carried out under the following measurement conditions. The surface tension of mercury was 480 dynes/cm, and an angle of contact between mercury and the sample was 140°.

Measurement Conditions

Measurement Temperature: 25° C.

Measurement Pressure: 1.07 psia to 59256.3 psia

6. Measurement of BET Specific Surface Area of Positive Electrode Active Material for Lithium Secondary Cell The BET specific surface area was measured using a FLOWSORB II2300 manufactured by Micromeritics Instrument Corporation after 1 g of the sample powder of lithium metal composite oxide was dried at 150° C. in a nitrogen atmosphere for 15 minutes.

(2) Pressurization Test of Positive Electrode Active Material, and Change in Secondary Particle Diameter after Pressurization 0.5 g of the lithium metal composite oxide powder to be measured was filled into a mold having a diameter of 13 mm and pressed with a uniaxial press at 50 MPa. Thereafter, the powder was taken out from the mold and the secondary particle diameter of the positive electrode active material for a lithium secondary cell after pressing (pressurization) was measured by the same method as in 3 above.

In the Examples, when the change in secondary particle diameter ($\Delta D_{50}$) before and after pressurization was 1.0 μm or more, it means that the positive electrode active material was crushed.

Example 1

1. Production of Positive Electrode Active Material A1

Into a reaction vessel equipped with a stirrer and an overflow pipe was charged water, followed by addition of an aqueous sodium hydroxide solution.

An aqueous nickel sulfate solution, an aqueous cobalt sulfate solution and an aqueous manganese sulfate solution were mixed together such that the atomic ratio between nickel atoms, cobalt atoms and manganese atoms became 0.315:0.330:0.355, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.1, while keeping the temperature of the solution in the reaction vessel at 50° C., thereby obtaining nickel-cobalt-manganese composite hydroxide particles. The resulting particles were washed with water after filtration, and dried at 100° C., to thereby obtain a nickel-cobalt-manganese composite hydroxide in the form of dry powder. The BET specific surface area of the nickel-cobalt-manganese composite hydroxide was 38.6 m²/g.

The thus obtained dry powder of nickel-cobalt-manganese composite hydroxide and a lithium carbonate powder were weighed such that Li/(Ni+Co+Mn)=1.085, followed by mixing. The resulting was calcined in ambient atmosphere at 950° C. for 10 hours, thereby obtaining a lithium-nickel-cobalt-manganese composite oxide A1 as a desired positive electrode active material A1.

2. Evaluation of Lithium Metal Composite Oxide

The results of the composition analysis of the positive electrode active material A1 revealed that the molar ratio of Li:Ni:Co:Mn was 1.09:0.315:0.330:0.355. Here, x was 0.04.

The secondary particle diameter of the positive electrode active material A1 was 2.1 μm.

The crystallite sizes calculated from peak A and peak B of the positive electrode active material A1 were respectively 778 Å and 510 Å.

The results of the pore distribution measurement of the positive electrode active material A1 revealed that the maximum peak value was observed at a pore diameter of 92 nm and the pore volume of pores having diameters in the range of 10 nm to 200 nm was 0.039 cm³/g. The BET specific surface area of the positive electrode active material A1 was 2.4 m²/g.

3. Secondary Particle Diameter of Positive Electrode Active Material after Pressurization The secondary particle diameter of the positive electrode active material after conducting the pressurization test under the aforementioned conditions was 1.7 μm, and the change in the secondary particle diameter ($\Delta D_{50}$) was 0.4 μm.

Example 2

1. Production of Positive Electrode Active Material A2

A nickel-cobalt-manganese composite hydroxide was produced following the same procedure as in Example 1 except that the pH of the solution in the reaction vessel was adjusted to 11.7. The BET specific surface area of the nickel-cobalt-manganese composite hydroxide was 32.5 m$^2$/g. Using the obtained nickel-cobalt-manganese composite hydroxide, a lithium-nickel-cobalt-manganese composite oxide A2 was produced following the same procedure as in Example 1.

2. Evaluation of Lithium Metal Composite Oxide

The results of the composition analysis of the positive electrode active material A2 revealed that the molar ratio of Li:Ni:Co:Mn was 1.13:0.315:0.330:0.355. Here, x was 0.06.

The secondary particle diameter of the positive electrode active material A2 was 4.3 μm.

The crystallite sizes calculated from peak A and peak B of the positive electrode active material A2 were respectively 830 Å and 508 Å.

The results of the pore distribution measurement of the positive electrode active material A2 revealed that the maximum peak value was observed at a pore diameter of 108 nm and the pore volume of pores having diameters in the range of 10 nm to 200 nm was 0.037 cm$^3$/g. The BET specific surface area of the positive electrode active material A2 was 2.4 m$^2$/g.

3. Secondary Particle Diameter of Positive Electrode Active Material After Pressurization The secondary particle diameter of the positive electrode active material after conducting the pressurization test under the aforementioned conditions was 4.0 μm, and the change in the secondary particle diameter ($\Delta D_{50}$) was 0.3 μm.

Example 3

1. Production of Positive Electrode Active Material A3

A nickel-cobalt-manganese composite hydroxide was produced following the same procedure as in Example 1 except that the pH of the solution in the reaction vessel was adjusted to 11.3. The BET specific surface area of the nickel-cobalt-manganese composite hydroxide was 29.7 m$^2$/g. Using the obtained nickel-cobalt-manganese composite hydroxide, a lithium-nickel-cobalt-manganese composite oxide A3 was produced following the same procedure as in Example 1.

2. Evaluation of Lithium Metal Composite Oxide

The results of the composition analysis of the positive electrode active material A3 revealed that the molar ratio of Li:Ni:Co:Mn was 1.12:0.315:0.330:0.355. Here, x was 0.06.

The secondary particle diameter of the positive electrode active material A3 was 5.2 μm.

The crystallite sizes calculated from peak A and peak B of the positive electrode active material A3 were respectively 746 Å and 434 Å.

The results of the pore distribution measurement of the positive electrode active material A3 revealed that the maximum peak value was observed at a pore diameter of 134 nm and the pore volume of pores having diameters in the range of 10 nm to 200 nm was 0.033 cm$^3$/g. The BET specific surface area of the positive electrode active material A3 was 2.1 m$^2$/g.

3. Secondary Particle Diameter of Positive Electrode Active Material After Pressurization The secondary particle diameter of the positive electrode active material after conducting the pressurization test under the aforementioned conditions was 4.6 μm, and the change in the secondary particle diameter ($\Delta D_{50}$) was 0.6 μm.

Example 4

1. Production of Positive Electrode Active Material A4

A nickel-cobalt-manganese composite hydroxide was produced following the same procedure as in Example 1 except that the temperature and pH of the solution in the reaction vessel were adjusted to 40° C. and 11.3, respectively. The BET specific surface area of the nickel-cobalt-manganese composite hydroxide was 22.1 m$^2$/g. Using the obtained nickel-cobalt-manganese composite hydroxide, a lithium-nickel-cobalt-manganese composite oxide A4 was produced following the same procedure as in Example 1.

2. Evaluation of Lithium Metal Composite Oxide

The results of the composition analysis of the positive electrode active material A4 revealed that the molar ratio of Li:Ni:Co:Mn was 1.10:0.315:0.330:0.355. Here, x was 0.05.

The secondary particle diameter of the positive electrode active material A4 was 8.2 μm.

The crystallite sizes calculated from peak A and peak B of the positive electrode active material A4 were respectively 879 Å and 546 Å.

The results of the pore distribution measurement of the positive electrode active material A4 revealed that the maximum peak value was observed at a pore diameter of 121 nm and the pore volume of pores having diameters in the range of 10 nm to 200 nm was 0.031 cm$^3$/g. The BET specific surface area of the positive electrode active material A4 was 1.9 m$^2$/g.

3. Secondary Particle Diameter of Positive Electrode Active Material After Pressurization The secondary particle diameter of the positive electrode active material after conducting the pressurization test under the aforementioned conditions was 7.6 μm, and the change in the secondary particle diameter ($\Delta D_{50}$) was 0.6 μm.

Example 5

1. Production of Positive Electrode Active Material A5

A nickel-cobalt-manganese composite hydroxide was produced following the same procedure as in Example 1 except that the temperature and pH of the solution in the reaction vessel were adjusted to 40° C. and 11.1, respectively. The BET specific surface area of the nickel-cobalt-manganese composite hydroxide was 18.6 m$^2$/g. Using the obtained nickel-cobalt-manganese composite hydroxide, a lithium-nickel-cobalt-manganese composite oxide A5 was produced following the same procedure as in Example 1.

2. Evaluation of Lithium Metal Composite Oxide

The results of the composition analysis of the positive electrode active material A5 revealed that the molar ratio of Li:Ni:Co:Mn was 1.10:0.315:0.330:0.355. Here, x was 0.05.

The secondary particle diameter of the positive electrode active material A5 was 9.8 μm.

The crystallite sizes calculated from peak A and peak B of the positive electrode active material A5 were respectively 820 Å and 511 Å.

The results of the pore distribution measurement of the positive electrode active material A5 revealed that the maximum peak value was observed at a pore diameter of 112 nm and the pore volume of pores having diameters in the range of 10 nm to 200 nm was 0.030 cm$^3$/g. The BET specific surface area of the positive electrode active material A5 was 1.6 m$^2$/g.

3. Secondary Particle Diameter of Positive Electrode Active Material After Pressurization The secondary particle diameter of the positive electrode active material after conducting the pressurization test under the aforementioned conditions was 9.2 µm, and the change in the secondary particle diameter ($\Delta D_{50}$) was 0.6 µm.

Comparative Example 1

1. Production of Positive Electrode Active Material B1

A nickel-cobalt-manganese composite hydroxide was produced following the same procedure as in Example 1 except that the temperature and pH of the solution in the reaction vessel were adjusted to 30° C. and 12.7, respectively. The BET specific surface area of the nickel-cobalt-manganese composite hydroxide was 46.6 m²/g. Using the obtained nickel-cobalt-manganese composite hydroxide, a lithium-nickel-cobalt-manganese composite oxide B1 was produced following the same procedure as in Example 1.

2. Evaluation of Lithium Metal Composite Oxide

The results of the composition analysis of the positive electrode active material B1 revealed that the molar ratio of Li:Ni:Co:Mn was 1.09:0.315:0.330:0.355. Here, x was 0.04.

The secondary particle diameter of the positive electrode active material B1 was 1.5 µm.

The crystallite sizes calculated from peak A and peak B of the positive electrode active material B1 were respectively 895 Å and 504 Å.

The results of the pore distribution measurement of the positive electrode active material B1 revealed that the maximum peak value was observed at a pore diameter of 53 nm and the pore volume of pores having diameters in the range of 10 nm to 200 nm was 0.042 cm³/g. The BET specific surface area of the positive electrode active material B1 was 2.9 m²/g.

3. Secondary Particle Diameter of Positive Electrode Active Material After Pressurization The secondary particle diameter of the positive electrode active material after conducting the pressurization test under the aforementioned conditions was 0.4 µm, and the change in the secondary particle diameter ($\Delta D_{50}$) was 1.1 µm.

Comparative Example 2

1. Production of Positive Electrode Active Material B2

A nickel-cobalt-manganese composite hydroxide was produced following the same procedure as in Example 1 except that the temperature and pH of the solution in the reaction vessel were adjusted to 30° C. and 12.0, respectively. The BET specific surface area of the nickel-cobalt-manganese composite hydroxide was 19.2 m²/g. Using the obtained nickel-cobalt-manganese composite hydroxide, a lithium-nickel-cobalt-manganese composite oxide B2 was produced following the same procedure as in Example 1.

2. Evaluation of Lithium Metal Composite Oxide

The results of the composition analysis of the positive electrode active material B2 revealed that the molar ratio of Li:Ni:Co:Mn was 1.10:0.315:0.330:0.355. Here, x was 0.05.

The secondary particle diameter of the positive electrode active material B2 was 11.5 µm.

The crystallite sizes calculated from peak A and peak B of the positive electrode active material B2 were respectively 976 Å and 623 Å.

The results of the pore distribution measurement of the positive electrode active material B2 revealed that the maximum peak value was observed at a pore diameter of 76 nm and the pore volume of pores having diameters in the range of 10 nm to 200 nm was 0.013 cm³/g. The BET specific surface area of the positive electrode active material B2 was 1.3 m²/g.

3. Secondary Particle Diameter of Positive Electrode Active Material After Pressurization The secondary particle diameter of the positive electrode active material after conducting the pressurization test under the aforementioned conditions was 10.2 µm, and the change in the secondary particle diameter ($\Delta D_{50}$) was 1.3 µm.

Comparative Example 3

1. Production of Positive Electrode Active Material B3

A nickel-cobalt-manganese composite hydroxide was produced following the same procedure as in Example 1 except that the aqueous nickel sulfate solution, the aqueous cobalt sulfate solution and the aqueous manganese sulfate solution were mixed together such that the atomic ratio between nickel atoms, cobalt atoms and manganese atoms became 0.334:0.333:0.333, to thereby prepare a raw material mixture solution, and that the temperature and pH of the solution in the reaction vessel were adjusted to 30° C. and 12.4, respectively. The BET specific surface area of the nickel-cobalt-manganese composite hydroxide was 21.3 m²/g. Using the obtained nickel-cobalt-manganese composite hydroxide, a lithium-nickel-cobalt-manganese composite oxide B3 was produced following the same procedure as in Example 1.

2. Evaluation of Lithium Metal Composite Oxide

The results of the composition analysis of the positive electrode active material B3 revealed that the molar ratio of Li:Ni:Co:Mn was 1.11:0.334:0.333:0.333. Here, x was 0.05.

The secondary particle diameter of the positive electrode active material B3 was 3.0 µm.

The crystallite sizes calculated from peak A and peak B of the positive electrode active material B3 were respectively 1,006 Å and 605 Å.

The results of the pore distribution measurement of the positive electrode active material B3 revealed that the maximum peak value was observed at a pore diameter of 86 nm and the pore volume of pores having diameters in the range of 10 nm to 200 nm was 0.020 cm³/g. The BET specific surface area of the positive electrode active material B3 was 1.6 m²/g.

3. Secondary Particle Diameter of Positive Electrode Active Material After Pressurization The secondary particle diameter of the positive electrode active material after conducting the pressurization test under the aforementioned conditions was 2.0 µm, and the change in the secondary particle diameter ($\Delta D_{50}$) was 1.0 µm.

Comparative Example 4

1. Production of Positive Electrode Active Material B4

A nickel-cobalt-manganese composite hydroxide was produced following the same procedure as in Example 1 except that the aqueous nickel sulfate solution, the aqueous cobalt sulfate solution and the aqueous manganese sulfate solution were mixed together such that the atomic ratio between nickel atoms, cobalt atoms and manganese atoms became 0.334:0.333:0.333, to thereby prepare a raw material mixture solution, and that the temperature and pH of the solution in the reaction vessel were adjusted to 30° C. and 11.1, respectively. The BET specific surface area of the nickel-cobalt-manganese composite hydroxide was 11.6 m²/g. Using the obtained nickel-cobalt-manganese composite hydroxide, a lithium-nickel-cobalt-manganese composite oxide B4 was produced following the same procedure as in Example 1.

2. Evaluation of Lithium Metal Composite Oxide

The results of the composition analysis of the positive electrode active material B4 revealed that the molar ratio of Li:Ni:Co:Mn was 1.10:0.334:0.333:0.333. Here, x was 0.05.

The secondary particle diameter of the positive electrode active material B4 was 8.9 μm.

The crystallite sizes calculated from peak A and peak B of the positive electrode active material B4 were respectively 1,187 Å and 721 Å.

The results of the pore distribution measurement of the positive electrode active material B4 revealed that no maximum peak was observed. The BET specific surface area of the positive electrode active material B5 was 0.6 m²/g.

3. Secondary Particle Diameter of Positive Electrode Active Material After Pressurization The secondary particle diameter of the positive electrode active material after conducting the pressurization test under the aforementioned conditions was 7.8 μm, and the change in the secondary particle diameter ($\Delta D_{50}$) was 1.1 μm.

Comparative Example 5

1. Production of Positive Electrode Active Material B5

A nickel-cobalt-manganese composite hydroxide was produced following the same procedure as in Example 1 except that the aqueous nickel sulfate solution, the aqueous cobalt sulfate solution and the aqueous manganese sulfate solution were mixed together such that the atomic ratio between nickel atoms, cobalt atoms and manganese atoms became 0.334:0.333:0.333, to thereby prepare a raw material mixture solution, and that the temperature and pH of the solution in the reaction vessel were adjusted to 40° C. and 11.0, respectively. The BET specific surface area of the nickel-cobalt-manganese composite hydroxide was 10.2 m²/g. Using the obtained nickel-cobalt-manganese composite hydroxide, a lithium-nickel-cobalt-manganese composite oxide B5 was produced following the same procedure as in Example 1.

2. Evaluation of Lithium Metal Composite Oxide

The results of the composition analysis of the positive electrode active material B5 revealed that the molar ratio of Li:Ni:Co:Mn was 1.10:0.334:0.333:0.333. Here, x was 0.05.

The secondary particle diameter of the positive electrode active material B5 was 11.8 μm.

The crystallite sizes calculated from peak A and peak B of the positive electrode active material B5 were respectively 1,201 Å and 743 Å.

The results of the pore distribution measurement of the positive electrode active material B5 revealed that no maximum peak was observed. The BET specific surface area of the positive electrode active material B5 was 0.6 m²/g.

3. Secondary Particle Diameter of Positive Electrode Active Material After Pressurization The secondary particle diameter of the positive electrode active material after conducting the pressurization test under the aforementioned conditions was 10.5 μm, and the change in the secondary particle diameter ($\Delta D_{50}$) was 1.3 μm.

Comparative Example 6

1. Production of Positive Electrode Active Material B6

A nickel-cobalt-manganese composite hydroxide was produced following the same procedure as in Example 1 except that the aqueous nickel sulfate solution, the aqueous cobalt sulfate solution and the aqueous manganese sulfate solution were mixed together such that the atomic ratio between nickel atoms, cobalt atoms and manganese atoms became 0.334:0.333:0.333, to thereby prepare a raw material mixture solution, and that the pH of the solution in the reaction vessel was adjusted to 11.1. The BET specific surface area of the nickel-cobalt-manganese composite hydroxide was 22.3 m²/g. Using the obtained nickel-cobalt-manganese composite hydroxide, a lithium-nickel-cobalt-manganese composite oxide B6 was produced following the same procedure as in Example 1.

2. Evaluation of Lithium Metal Composite Oxide

The results of the composition analysis of the positive electrode active material B6 revealed that the molar ratio of Li:Ni:Co:Mn was 1.11:0.334:0.333:0.333. Here, x was 0.05.

The secondary particle diameter of the positive electrode active material B6 was 4.3 μm.

The crystallite sizes calculated from peak A and peak B of the positive electrode active material B6 were respectively 1,046 Å and 661 Å.

The results of the pore distribution measurement of the positive electrode active material B6 revealed that the maximum peak value was observed at a pore diameter of 167 nm and the pore volume of pores having diameters in the range of 10 nm to 200 nm was 0.029 cm³/g. The BET specific surface area of the positive electrode active material B6 was 1.4 m²/g.

3. Secondary Particle Diameter of Positive Electrode Active Material After Pressurization The secondary particle diameter of the positive electrode active material after conducting the pressurization test under the aforementioned conditions was 3.2 μm, and the change in the secondary particle diameter ($\Delta D_{50}$) was 1.1 μm.

Comparative Example 7

1. Production of Positive Electrode Active Material B7

A nickel-cobalt-manganese composite hydroxide was produced following the same procedure as in Example 1 except that the aqueous nickel sulfate solution, the aqueous cobalt sulfate solution and the aqueous manganese sulfate solution were mixed together such that the atomic ratio between nickel atoms, cobalt atoms and manganese atoms became 0.35:0.30:0.35, to thereby prepare a raw material mixture solution, and that the pH of the solution in the reaction vessel was adjusted to 11.4. The BET specific surface area of the nickel-cobalt-manganese composite hydroxide was 20.0 m²/g. Using the obtained nickel-cobalt-manganese composite hydroxide, a lithium-nickel-cobalt-manganese composite oxide B7 was produced following the same procedure as in Example 1.

2. Evaluation of Lithium Metal Composite Oxide

The results of the composition analysis of the positive electrode active material B7 revealed that the molar ratio of Li:Ni:Co:Mn was 1.11:0.35:0.30:0.35. Here, x was 0.05.

The secondary particle diameter of the positive electrode active material B7 was 4.2 μm.

The crystallite sizes calculated from peak A and peak B of the positive electrode active material B7 were respectively 920 Å and 526 Å.

The results of the pore distribution measurement of the positive electrode active material B7 revealed that the maximum peak value was observed at a pore diameter of 168 nm and the pore volume of pores having diameters in the range of 10 nm to 200 nm was 0.039 cm³/g. The BET specific surface area of the positive electrode active material B7 was 1.7 m²/g.

3. Secondary Particle Diameter of Positive Electrode Active Material After Pressurization The secondary particle diameter of the positive electrode active material after conducting the pressurization test under the aforementioned conditions was 3.2 μm, and the change in the secondary particle diameter ($\Delta D_{50}$) was 1.0 μm.

With respect to each of Examples 1 to 5 and Comparative Examples 1 to 7, Table 1 below shows the composition ratio (Ni/Co/Mn), the secondary particle diameter (μm), the crystallite size (peak A/peak B, unit: Å), the maximum peak value (nm) in the pore diameter distribution, the pore volume of 10- to 200-nm pores ($cm^3/g$), The BET specific surface area ($m^2/g$), and the change in secondary particle diameter (described as "$\Delta D_{50}$" in Table 1, unit: μm).

TABLE 1

| | Ni/Co/Mn | Secondary Particle Diameter (μm) | Crystallite Size Peak A/Peak B (Å) | Maximum Peak Value of Pore Diameter (nm) | Pore Volume (10 nm-200 nm) ($cm^3/g$) | BET Specific Surface Area ($m^2/g$) | $\Delta D_{50}$ (μm) |
|---|---|---|---|---|---|---|---|
| Ex. 1 | 31.5/33.0/35.5 | 2.1 | 778/510 | 92 | 0.039 | 2.4 | 0.4 |
| Ex. 2 | 31.5/33.0/35.5 | 4.3 | 830/508 | 108 | 0.037 | 2.4 | 0.3 |
| Ex. 3 | 31.5/33.0/35.5 | 5.2 | 746/434 | 134 | 0.033 | 2.1 | 0.6 |
| Ex. 4 | 31.5/33.0/35.5 | 8.2 | 879/546 | 121 | 0.031 | 1.9 | 0.6 |
| Ex. 5 | 31.5/33.0/35.5 | 9.8 | 820/511 | 112 | 0.030 | 1.6 | 0.6 |
| Comp. Ex. 1 | 31.5/33.0/35.5 | 1.5 | 895/504 | 53 | 0.042 | 2.9 | 1.1 |
| Comp. Ex. 2 | 31.5/33.0/35.5 | 11.5 | 976/623 | 76 | 0.013 | 1.3 | 1.3 |
| Comp. Ex. 3 | 33.4/33.3/33.3 | 3.0 | 1006/605 | 86 | 0.020 | 1.6 | 1.0 |
| Comp. Ex. 4 | 33.4/33.3/33.3 | 8.9 | 1187/721 | No peak | 0 | 0.6 | 1.1 |
| Comp. Ex. 5 | 33.4/33.3/33.3 | 11.8 | 1201/743 | No peak | 0 | 0.6 | 1.3 |
| Comp. Ex. 6 | 33.4/33.3/33.3 | 4.3 | 1046/661 | 167 | 0.029 | 1.4 | 1.1 |
| Comp. Ex. 7 | 35.0/30.0/35.0 | 4.2 | 920/526 | 168 | 0.039 | 1.7 | 1.0 |

As a result of the evaluation, it was found that the positive electrode active materials using the lithium metal composite oxides of Examples 1 to 5 suffered only small change in secondary particle diameter ($\Delta D_{50}$) before and after the pressurization, i.e., the change as small as 0.6 μm or less, and the crushing of the positive electrode active material by pressurization was considerably suppressed.

On the other hand, the positive electrode active materials using the lithium metal composite oxides of Comparative Examples 1 to 7 suffered a large change in secondary particle diameter ($\Delta D_{50}$) before and after the pressurization, i.e., the change as large as 1.0 μm or more, and the positive electrode active materials were crushed by pressurization.

Example 6

1. Production of Positive Electrode Active Material A6

Into a reaction vessel equipped with a stirrer and an overflow pipe was charged water, followed by addition of an aqueous sodium hydroxide solution.

An aqueous nickel sulfate solution, an aqueous cobalt sulfate solution and an aqueous manganese sulfate solution were mixed together such that the atomic ratio between nickel atoms, cobalt atoms and manganese atoms became 0.315:0.330:0.355, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.3, while keeping the temperature of the solution in the reaction vessel at 50° C., thereby obtaining nickel-cobalt-manganese composite hydroxide particles. The resulting particles were washed with water after filtration, and dried at 100° C., to thereby obtain a nickel-cobalt-manganese composite hydroxide in the form of dry powder. The BET specific surface area of the nickel-cobalt-manganese composite hydroxide was 34.7 $m^2/g$.

The thus obtained dry powder of nickel-cobalt-manganese composite hydroxide and a lithium carbonate powder were weighed such that Li/(Ni+Co+Mn)=1.1, followed by addition and MgO such that Mg/(Ni+Co+Mn+Mg)=0.001, and the resulting was mixed. The obtained product was calcined at 690° C. for 5 hours. The resulting was further calcined in ambient atmosphere at 925° C. for 6 hours, to thereby obtain a positive electrode active material A6 as an end product, i.e., lithium-nickel-cobalt-manganese composite oxide A6.

2. Evaluation of Lithium Metal Composite Oxide

The results of the composition analysis of the positive electrode active material A6 revealed that the molar ratio of Li:Ni:Co:Mn:Mg was 1.13:0.317:0.329:0.353:0.001. Here, x was 0.06.

The secondary particle diameter of the positive electrode active material A6 was 3.1 μm.

The crystallite sizes calculated from peak A and peak B of the positive electrode active material A6 were respectively 905 Å and 533 Å.

The results of the pore distribution measurement of the positive electrode active material A6 revealed that the maximum peak value was observed at a pore diameter of 108 nm and the pore volume of pores having diameters in the range of 10 nm to 200 nm was 0.032 $cm^3/g$. The BET specific surface area of the positive electrode active material A6 was 2.2 $m^2/g$.

3. Secondary Particle Diameter of Positive Electrode Active Material After Pressurization The secondary particle diameter of the positive electrode active material after conducting the pressurization test under the aforementioned conditions was 2.5 μm, and the change in the secondary particle diameter ($\Delta D_{50}$) was 0.6 μm.

Example 7

1. Production of Positive Electrode Active Material A7

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and MgO such that Mg/(Ni+Co+Mn+Mg)=0.005, and the resulting was mixed. The obtained product was calcined at 690° C. for 5 hours. The resulting was further calcined in ambient atmosphere at 925° C. for 6 hours, to thereby obtain a positive electrode active material A7 as an end product, i.e., lithium-nickel-cobalt-manganese composite oxide A7.

2. Evaluation of Lithium Metal Composite Oxide

The results of the composition analysis of the positive electrode active material A7 revealed that the molar ratio of Li:Ni:Co:Mn:Mg was 1.14:0.316:0.327:0.353:0.004. Here, x was 0.07.

The secondary particle diameter of the positive electrode active material A7 was 3.1 μm.

The crystallite sizes calculated from peak A and peak B of the positive electrode active material A7 were respectively 936 Å and 543 Å.

The results of the pore distribution measurement of the positive electrode active material A7 revealed that the maximum peak value was observed at a pore diameter of 108 nm and the pore volume of pores having diameters in the range of 10 nm to 200 nm was 0.036 cm$^3$/g. The BET specific surface area of the positive electrode active material A7 was 2.2 m$^2$/g.

3. Secondary Particle Diameter of Positive Electrode Active Material After Pressurization The secondary particle diameter of the positive electrode active material after conducting the pressurization test under the aforementioned conditions was 2.4 μm, and the change in the secondary particle diameter ($\Delta D_{50}$) was 0.7 μm.

Example 8

1. Production of Positive Electrode Active Material A8

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and MgO such that Mg/(Ni+Co+Mn+Mg)=0.03, and the resulting was mixed. The obtained product was calcined at 690° C. for 5 hours. The resulting was further calcined in ambient atmosphere at 925° C. for 6 hours, to thereby obtain a positive electrode active material A8 as an end product, i.e., lithium-nickel-cobalt-manganese composite oxide A8.

2. Evaluation of Lithium Metal Composite Oxide

The results of the composition analysis of the positive electrode active material A8 revealed that the molar ratio of Li:Ni:Co:Mn:Mg was 1.14:0.306:0.321:0.344:0.029. Here, x was 0.07.

The secondary particle diameter of the positive electrode active material A8 was 3.2 μm.

The crystallite sizes calculated from peak A and peak B of the positive electrode active material A8 were respectively 947 Å and 550 Å.

The results of the pore distribution measurement of the positive electrode active material A8 revealed that the maximum peak value was observed at a pore diameter of 108 nm and the pore volume of pores having diameters in the range of 10 nm to 200 nm was 0.034 cm$^3$/g. The BET specific surface area of the positive electrode active material A8 was 2.1 m$^2$/g.

3. Secondary Particle Diameter of Positive Electrode Active Material After Pressurization The secondary particle diameter of the positive electrode active material after conducting the pressurization test under the aforementioned conditions was 2.6 μm, and the change in the secondary particle diameter ($\Delta D_{50}$) was 0.6 μm.

Example 9

1. Production of Positive Electrode Active Material A9

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and $Al_2O_3$ such that Al/(Ni+Co+Mn+Al)=0.001, and the resulting was mixed. The obtained product was calcined at 690° C. for 5 hours. The resulting was further calcined in ambient atmosphere at 925° C. for 6 hours, to thereby obtain a positive electrode active material A9 as an end product, i.e., lithium-nickel-cobalt-manganese composite oxide A9.

2. Evaluation of Lithium Metal Composite Oxide

The results of the composition analysis of the positive electrode active material A9 revealed that the molar ratio of Li:Ni:Co:Mn:Al was 1.13:0.317:0.328:0.354:0.001. Here, x was 0.06.

The secondary particle diameter of the positive electrode active material A9 was 3.2 μm.

The crystallite sizes calculated from peak A and peak B of the positive electrode active material A9 were respectively 875 Å and 530 Å.

The results of the pore distribution measurement of the positive electrode active material A9 revealed that the maximum peak value was observed at a pore diameter of 108 nm and the pore volume of pores having diameters in the range of 10 nm to 200 nm was 0.035 cm$^3$/g. The BET specific surface area of the positive electrode active material A9 was 2.3 m$^2$/g.

3. Secondary Particle Diameter of Positive Electrode Active Material After Pressurization The secondary particle diameter of the positive electrode active material after conducting the pressurization test under the aforementioned conditions was 2.4 μm, and the change in the secondary particle diameter ($\Delta D_{50}$) was 0.8 μm.

Example 10

1. Production of Positive Electrode Active Material A10

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and $Al_2O_3$ such that Al/(Ni+Co+Mn+Al)=0.005, and the resulting was mixed. The obtained product was calcined at 690° C. for 5 hours. The resulting was further calcined in ambient atmosphere at 925° C. for 6 hours, to thereby obtain a positive electrode active material A10 as an end product, i.e., lithium-nickel-cobalt-manganese composite oxide A10.

2. Evaluation of Lithium Metal Composite Oxide

The results of the composition analysis of the positive electrode active material A10 revealed that the molar ratio of Li:Ni:Co:Mn:Al was 1.13:0.316:0.327:0.352:0.005. Here, x was 0.06.

The secondary particle diameter of the positive electrode active material A10 was 3.1 μm.

The crystallite sizes calculated from peak A and peak B of the positive electrode active material A10 were respectively 885 Å and 533 Å.

The results of the pore distribution measurement of the positive electrode active material A10 revealed that the maximum peak value was observed at a pore diameter of 108 nm and the pore volume of pores having diameters in the range of 10 nm to 200 nm was 0.034 cm$^3$/g. The BET specific surface area of the positive electrode active material A10 was 2.3 m$^2$/g.

3. Secondary Particle Diameter of Positive Electrode Active Material After Pressurization The secondary particle diameter of the positive electrode active material after conducting the pressurization test under the aforementioned conditions was 2.5 μm, and the change in the secondary particle diameter ($\Delta D_{50}$) was 0.6 μm.

Example 11

1. Production of Positive Electrode Active Material A11

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and Al$_2$O$_3$ such that Al/(Ni+Co+Mn+Al)=0.03, and the resulting was mixed. The obtained product was calcined at 690° C. for 5 hours. The resulting was further calcined in ambient atmosphere at 925° C. for 6 hours, to thereby obtain a positive electrode active material A11 as an end product, i.e., lithium-nickel-cobalt-manganese composite oxide A11.

2. Evaluation of Lithium Metal Composite Oxide

The results of the composition analysis of the positive electrode active material A11 revealed that the molar ratio of Li:Ni:Co:Mn:Al was 1.12:0.308:0.319:0.344:0.029. Here, x was 0.06.

The secondary particle diameter of the positive electrode active material A11 was 3.2 μm.

The crystallite sizes calculated from peak A and peak B of the positive electrode active material A11 were respectively 895 Å and 565 Å.

The results of the pore distribution measurement of the positive electrode active material A11 revealed that the maximum peak value was observed at a pore diameter of 108 nm and the pore volume of pores having diameters in the range of 10 nm to 200 nm was 0.032 cm$^3$/g. The BET specific surface area of the positive electrode active material A11 was 2.3 m$^2$/g.

3. Secondary Particle Diameter of Positive Electrode Active Material After Pressurization The secondary particle diameter of the positive electrode active material after conducting the pressurization test under the aforementioned conditions was 2.5 μm, and the change in the secondary particle diameter ($\Delta D_{50}$) was 0.7 μm.

Example 12

1. Production of Positive Electrode Active Material A12

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and ZrO$_2$ such that Zr/(Ni+Co+Mn+Zr)=0.001, and the resulting was mixed. The obtained product was calcined at 690° C. for 5 hours. The resulting was further calcined in ambient atmosphere at 925° C. for 6 hours, to thereby obtain a positive electrode active material A12 as an end product, i.e., lithium-nickel-cobalt-manganese composite oxide A12.

2. Evaluation of Lithium Metal Composite Oxide

The results of the composition analysis of the positive electrode active material A12 revealed that the molar ratio of Li:Ni:Co:Mn:Zr was 1.13:0.315:0.330:0.354:0.001. Here, x was 0.06.

The secondary particle diameter of the positive electrode active material A12 was 3.1 μm.

The crystallite sizes calculated from peak A and peak B of the positive electrode active material A12 were respectively 915 Å and 550 Å.

The results of the pore distribution measurement of the positive electrode active material A12 revealed that the maximum peak value was observed at a pore diameter of 108 nm and the pore volume of pores having diameters in the range of 10 nm to 200 nm was 0.032 cm$^3$/g. The BET specific surface area of the positive electrode active material A12 was 2.1 m$^2$/g.

3. Secondary Particle Diameter of Positive Electrode Active Material After Pressurization The secondary particle diameter of the positive electrode active material after conducting the pressurization test under the aforementioned conditions was 2.6 μm, and the change in the secondary particle diameter ($\Delta D_{50}$) was 0.5 μm.

Example 13

1. Production of Positive Electrode Active Material A13

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and ZrO$_2$ such that Zr/(Ni+Co+Mn+Zr)=0.005, and the resulting was mixed. The obtained product was calcined at 690° C. for 5 hours. The resulting was further calcined in ambient atmosphere at 925° C. for 6 hours, to thereby obtain a positive electrode active material A13 as an end product, i.e., lithium-nickel-cobalt-manganese composite oxide A13.

2. Evaluation of Lithium Metal Composite Oxide

The results of the composition analysis of the positive electrode active material A13 revealed that the molar ratio of Li:Ni:Co:Mn:Zr was 1.13:0.315:0.328:0.352:0.005. Here, x was 0.06.

The secondary particle diameter of the positive electrode active material A13 was 3.2 μm.

The crystallite sizes calculated from peak A and peak B of the positive electrode active material A13 were respectively 875 Å and 530 Å.

The results of the pore distribution measurement of the positive electrode active material A13 revealed that the maximum peak value was observed at a pore diameter of 108 nm and the pore volume of pores having diameters in the range of 10 nm to 200 nm was 0.034 cm$^3$/g. The BET specific surface area of the positive electrode active material A13 was 2.3 m$^2$/g.

3. Secondary Particle Diameter of Positive Electrode Active Material After Pressurization The secondary particle diameter of the positive electrode active material after conducting the pressurization test under the aforementioned conditions was 2.3 μm, and the change in the secondary particle diameter ($\Delta D_{50}$) was 0.9 μm.

Example 14

1. Production of Positive Electrode Active Material A14

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and $ZrO_2$ such that Zr/(Ni+Co+Mn+Zr)=0.03, and the resulting was mixed. The obtained product was calcined at 690° C. for 5 hours. The resulting was further calcined in ambient atmosphere at 925° C. for 6 hours, to thereby obtain a positive electrode active material A14 as an end product, i.e., lithium-nickel-cobalt-manganese composite oxide A14.

2. Evaluation of Lithium Metal Composite Oxide

The results of the composition analysis of the positive electrode active material A14 revealed that the molar ratio of Li:Ni:Co:Mn:Zr was 1.10:0.308:0.318:0.342:0.032. Here, x was 0.05.

The secondary particle diameter of the positive electrode active material A14 was 3.2 µm.

The crystallite sizes calculated from peak A and peak B of the positive electrode active material A14 were respectively 866 Å and 533 Å.

The results of the pore distribution measurement of the positive electrode active material A14 revealed that the maximum peak value was observed at a pore diameter of 108 nm and the pore volume of pores having diameters in the range of 10 nm to 200 nm was 0.035 cm³/g. The BET specific surface area of the positive electrode active material A14 was 2.5 m²/g.

3. Secondary Particle Diameter of Positive Electrode Active Material After Pressurization The secondary particle diameter of the positive electrode active material after conducting the pressurization test under the aforementioned conditions was 2.4 µm, and the change in the secondary particle diameter ($\Delta D_{50}$) was 0.8 µm.

Example 15

1. Production of Positive Electrode Active Material A15

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and $V_2O_5$ such that V/(Ni+Co+Mn+V)=0.001, and the resulting was mixed. The obtained product was calcined at 690° C. for 5 hours. The resulting was further calcined in ambient atmosphere at 925° C. for 6 hours, to thereby obtain a positive electrode active material A15 as an end product, i.e., lithium-nickel-cobalt-manganese composite oxide A15.

2. Evaluation of Lithium Metal Composite Oxide

The results of the composition analysis of the positive electrode active material A15 revealed that the molar ratio of Li:Ni:Co:Mn:V was 1.13:0.317:0.329:0.353:0.001. Here, x was 0.06.

The secondary particle diameter of the positive electrode active material A15 was 3.1 µm.

The crystallite sizes calculated from peak A and peak B of the positive electrode active material A15 were respectively 905 Å and 558 Å.

The results of the pore distribution measurement of the positive electrode active material A15 revealed that the maximum peak value was observed at a pore diameter of 108 nm and the pore volume of pores having diameters in the range of 10 nm to 200 nm was 0.033 cm³/g. The BET specific surface area of the positive electrode active material A15 was 2.1 m²/g.

3. Secondary Particle Diameter of Positive Electrode Active Material After Pressurization The secondary particle diameter of the positive electrode active material after conducting the pressurization test under the aforementioned conditions was 2.2 µm, and the change in the secondary particle diameter ($\Delta D_{50}$) was 0.9 µm.

Example 16

1. Production of Positive Electrode Active Material A16

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and $V_2O_5$ such that V/(Ni+Co+Mn+V)=0.005, and the resulting was mixed. The obtained product was calcined at 690° C. for 5 hours. The resulting was further calcined in ambient atmosphere at 925° C. for 6 hours, to thereby obtain a positive electrode active material A16 as an end product, i.e., lithium-nickel-cobalt-manganese composite oxide A16.

2. Evaluation of Lithium Metal Composite Oxide

The results of the composition analysis of the positive electrode active material A16 revealed that the molar ratio of Li:Ni:Co:Mn:V was 1.12:0.314:0.328:0.352:0.005. Here, x was 0.06.

The secondary particle diameter of the positive electrode active material A16 was 3.2 µm.

The crystallite sizes calculated from peak A and peak B of the positive electrode active material A16 were respectively 895 Å and 550 Å.

The results of the pore distribution measurement of the positive electrode active material A16 revealed that the maximum peak value was observed at a pore diameter of 108 nm and the pore volume of pores having diameters in the range of 10 nm to 200 nm was 0.033 cm³/g. The BET specific surface area of the positive electrode active material A16 was 2.2 m²/g.

3. Secondary Particle Diameter of Positive Electrode Active Material After Pressurization The secondary particle diameter of the positive electrode active material after conducting the pressurization test under the aforementioned conditions was 2.4 µm, and the change in the secondary particle diameter ($\Delta D_{50}$) was 0.8 µm.

Example 17

1. Production of Positive Electrode Active Material A17

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and $V_2O_5$ such that V/(Ni+Co+Mn+V)=0.03, and the resulting was mixed. The obtained product was calcined at 690° C. for 5 hours. The resulting was further calcined in ambient atmosphere at 925° C. for 6 hours, to thereby obtain a positive electrode active material A17 as an end product, i.e., lithium-nickel-cobalt-manganese composite oxide A17.

2. Evaluation of Lithium Metal Composite Oxide

The results of the composition analysis of the positive electrode active material A17 revealed that the molar ratio of Li:Ni:Co:Mn:V was 1.07:0.308:0.318:0.343:0.030. Here, x was 0.03.

The secondary particle diameter of the positive electrode active material A17 was 3.3 μm.

The crystallite sizes calculated from peak A and peak B of the positive electrode active material A17 were respectively 970 Å and 572 Å.

The results of the pore distribution measurement of the positive electrode active material A17 revealed that the maximum peak value was observed at a pore diameter of 108 nm and the pore volume of pores having diameters in the range of 10 nm to 200 nm was 0.027 cm³/g. The BET specific surface area of the positive electrode active material A17 was 1.9 m²/g.

3. Secondary Particle Diameter of Positive Electrode Active Material After Pressurization The secondary particle diameter of the positive electrode active material after conducting the pressurization test under the aforementioned conditions was 2.5 μm, and the change in the secondary particle diameter ($\Delta D_{50}$) was 0.8 μm.

Example 18

1. Production of Positive Electrode Active Material A18

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and SnO such that Sn/(Ni+Co+Mn+Sn)=0.001, and the resulting was mixed. The obtained product was calcined at 690° C. for 5 hours. The resulting was further calcined in ambient atmosphere at 925° C. for 6 hours, to thereby obtain a positive electrode active material A18 as an end product, i.e., lithium-nickel-cobalt-manganese composite oxide A18.

2. Evaluation of Lithium Metal Composite Oxide

The results of the composition analysis of the positive electrode active material A18 revealed that the molar ratio of Li:Ni:Co:Mn:Sn was 1.14:0.317:0.329:0.353:0.001. Here, x was 0.07.

The secondary particle diameter of the positive electrode active material A18 was 3.2 μm.

The crystallite sizes calculated from peak A and peak B of the positive electrode active material A18 were respectively 959 Å and 547 Å.

The results of the pore distribution measurement of the positive electrode active material A18 revealed that the maximum peak value was observed at a pore diameter of 108 nm and the pore volume of pores having diameters in the range of 10 nm to 200 nm was 0.031 cm³/g. The BET specific surface area of the positive electrode active material A18 was 2.2 m²/g.

3. Secondary Particle Diameter of Positive Electrode Active Material After Pressurization The secondary particle diameter of the positive electrode active material after conducting the pressurization test under the aforementioned conditions was 2.5 μm, and the change in the secondary particle diameter ($\Delta D_{50}$) was 0.7 μm.

Example 19

1. Production of Positive Electrode Active Material A19

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and SnO such that Sn/(Ni+Co+Mn+Sn)=0.005, and the resulting was mixed. The obtained product was calcined at 690° C. for 5 hours. The resulting was further calcined in ambient atmosphere at 925° C. for 6 hours, to thereby obtain a positive electrode active material A19 as an end product, i.e., lithium-nickel-cobalt-manganese composite oxide A19.

2. Evaluation of Lithium Metal Composite Oxide

The results of the composition analysis of the positive electrode active material A19 revealed that the molar ratio of Li:Ni:Co:Mn:Sn was 1.13:0.315:0.328:0.352:0.005. Here, x was 0.06.

The secondary particle diameter of the positive electrode active material A19 was 3.1 μm.

The crystallite sizes calculated from peak A and peak B of the positive electrode active material A19 were respectively 915 Å and 543 Å.

The results of the pore distribution measurement of the positive electrode active material A19 revealed that the maximum peak value was observed at a pore diameter of 108 nm and the pore volume of pores having diameters in the range of 10 nm to 200 nm was 0.034 cm³/g. The BET specific surface area of the positive electrode active material A19 was 2.1 m²/g.

3. Secondary Particle Diameter of Positive Electrode Active Material After Pressurization The secondary particle diameter of the positive electrode active material after conducting the pressurization test under the aforementioned conditions was 2.6 μm, and the change in the secondary particle diameter ($\Delta D_{50}$) was 0.5 μm.

Example 20

1. Production of Positive Electrode Active Material A20

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, followed by addition and SnO such that Sn/(Ni+Co+Mn+Sn)=0.03, and the resulting was mixed. The obtained product was calcined at 690° C. for 5 hours. The resulting was further calcined in ambient atmosphere at 925° C. for 6 hours, to thereby obtain a positive electrode active material A20 as an end product, i.e., lithium-nickel-cobalt-manganese composite oxide A20.

2. Evaluation of Lithium Metal Composite Oxide

The results of the composition analysis of the positive electrode active material A20 revealed that the molar ratio of Li:Ni:Co:Mn:Sn was 1.10:0.308:0.320:0.344:0.028. Here, x was 0.05.

The secondary particle diameter of the positive electrode active material A20 was 3.1 μm.

The crystallite sizes calculated from peak A and peak B of the positive electrode active material A20 were respectively 936 Å and 569 Å.

The results of the pore distribution measurement of the positive electrode active material A20 revealed that the maximum peak value was observed at a pore diameter of 108 nm and the pore volume of pores having diameters in the range of 10 nm to 200 nm was 0.033 cm³/g. The BET specific surface area of the positive electrode active material A20 was 2.2 m²/g.

3. Secondary Particle Diameter of Positive Electrode Active Material After Pressurization The secondary particle diameter of the positive electrode active material after conducting the pressurization test under the aforementioned conditions was 2.4 μm, and the change in the secondary particle diameter ($\Delta D_{50}$) was 0.7 μm.

Example 21

1. Production of Positive Electrode Active Material A21

A nickel-cobalt-manganese composite hydroxide was produced following the same procedure as in Example 6.

An aqueous LiOH solution having dissolved therein 61 g/L of $WO_3$ was prepared.

The prepared W-dissolved aqueous LiOH solution was allowed to deposit on the nickel-cobalt-manganese composite hydroxide by a Loedige mixer, such that W/(Ni+Co+Mn+W)=0.005. The thus obtained nickel-cobalt-manganese composite hydroxide and a lithium carbonate powder were weighed such that Li/(Ni+Co+Mn)=1.09, followed by mixing. The resulting was calcined at 690° C. for 5 hours, and further calcined in ambient atmosphere at 925° C. for 6 hours, thereby obtaining a lithium-nickel-cobalt-manganese composite oxide A21 as a desired positive electrode active material A21.

2. Evaluation of Lithium Metal Composite Oxide

The results of the composition analysis of the positive electrode active material A21 revealed that the molar ratio of Li:Ni:Co:Mn:W was 1.11:0.315:0.329:0.351:0.005. Here, x was 0.05.

The secondary particle diameter of the positive electrode active material A21 was 3.2 μm.

The crystallite sizes calculated from peak A and peak B of the positive electrode active material A21 were respectively 875 Å and 496 Å.

The results of the pore distribution measurement of the positive electrode active material A21 revealed that the maximum peak value was observed at a pore diameter of 90 nm and the pore volume of pores having diameters in the range of 10 nm to 200 nm was 0.043 cm³/g. The BET specific surface area of the positive electrode active material A21 was 2.4 m²/g.

3. Secondary Particle Diameter of Positive Electrode Active Material After Pressurization The secondary particle diameter of the positive electrode active material after conducting the pressurization test under the aforementioned conditions was 2.7 μm, and the change in the secondary particle diameter ($\Delta D_{50}$) was 0.5 μm.

Example 22

1. Production of Positive Electrode Active Material A22

A nickel-cobalt-manganese composite hydroxide was produced following the same procedure as in Example 6.

The thus obtained dry powder of nickel-cobalt-manganese composite hydroxide and a lithium carbonate powder were weighed such that Li/(Ni+Co+Mn)=1.1, and the resulting was mixed. The obtained product was calcined at 690° C. for 5 hours. Then, $WO_3$ was added to this product such that W/(Ni+Co+Mn+W)=0.001, and the resulting was calcined in ambient atmosphere at 925° C. for 6 hours, to thereby obtain a positive electrode active material A22 as an end product, i.e., lithium-nickel-cobalt-manganese composite oxide A22.

2. Evaluation of Lithium Metal Composite Oxide

The results of the composition analysis of the positive electrode active material A22 revealed that the molar ratio of Li:Ni:Co:Mn:W was 1.13:0.317:0.329:0.353:0.001. Here, x was 0.06.

The secondary particle diameter of the positive electrode active material A22 was 3.2 μm.

The crystallite sizes calculated from peak A and peak B of the positive electrode active material A22 were respectively 936 Å and 569 Å.

The results of the pore distribution measurement of the positive electrode active material A22 revealed that the maximum peak value was observed at a pore diameter of 108 nm and the pore volume of pores having diameters in the range of 10 nm to 200 nm was 0.035 cm³/g. The BET specific surface area of the positive electrode active material A22 was 2.2 m²/g.

3. Secondary Particle Diameter of Positive Electrode Active Material After Pressurization The secondary particle diameter of the positive electrode active material after conducting the pressurization test under the aforementioned conditions was 2.5 μm, and the change in the secondary particle diameter ($\Delta D_{50}$) was 0.7 μm.

With respect to each of Examples 6 to 22, Table 2 below shows the composition ratio (Li/Ni/Co/Mn/M), the type of the metal M, the secondary particle diameter (μm), the crystallite size (peak A/peak B, unit: Å), the maximum peak value (nm) of pore diameter, the pore volume of 10- to 200-nm pores (cm³/g), the BET specific surface area (m²/g), and the change in secondary particle diameter (described as "$\Delta D_{50}$" in Table 2).

TABLE 2

|  | Li/Ni/Co/Mn/M | Type of Metal M | Secondary Particle Diameter (μm) | Crystallite Size Peak A/Peak B (Å) | Maximum Peak Value of Pore Diameter | Pore Volume (10 nm-200 nm) (cm³/g) | BET Specific Surface Area (m²/g) | $\Delta D_{50}$ (μm) |
|---|---|---|---|---|---|---|---|---|
| Ex. 6 | 1.13/0.317/0.329/0.353/0.001 | Mg | 3.1 | 905/533 | 108 | 0.032 | 2.2 | 0.6 |
| Ex. 7 | 1.14/0.316/0.327/0.353/0.004 | Mg | 3.1 | 936/543 | 108 | 0.036 | 2.2 | 0.7 |
| Ex. 8 | 1.14/0.306/0.321/0.344/0.029 | Mg | 3.2 | 947/550 | 108 | 0.034 | 2.1 | 0.6 |
| Ex. 9 | 1.13/0.317/0.328/0.354/0.001 | Al | 3.2 | 875/530 | 108 | 0.035 | 2.3 | 0.8 |
| Ex. 10 | 1.13/0.316/0.327/0.352/0.005 | Al | 3.1 | 885/533 | 108 | 0.034 | 2.3 | 0.6 |
| Ex. 11 | 1.12/0.308/0.319/0.344/0.029 | Al | 3.2 | 895/565 | 108 | 0.032 | 2.3 | 0.7 |
| Ex. 12 | 1.13/0.315/0.330/0.354/0.001 | Zr | 3.1 | 915/550 | 108 | 0.034 | 2.1 | 0.5 |
| Ex. 13 | 1.13/0.315/0.328/0.352/0.005 | Zr | 3.2 | 875/530 | 108 | 0.034 | 2.3 | 0.9 |
| Ex. 14 | 1.10/0.308/0.318/0.342/0.032 | Zr | 3.2 | 866/533 | 108 | 0.035 | 2.5 | 0.8 |
| Ex. 15 | 1.13/0.317/0.329/0.353/0.001 | V | 3.1 | 905/558 | 108 | 0.033 | 2.1 | 0.9 |
| Ex. 16 | 1.12/0.314/0.328/0.352/0.005 | V | 3.2 | 895/550 | 108 | 0.033 | 2.2 | 0.8 |
| Ex. 17 | 1.07/0.308/0.318/0.343/0.030 | V | 3.3 | 970/572 | 108 | 0.027 | 1.9 | 0.8 |
| Ex. 18 | 1.14/0.317/0.329/0.353/0.001 | Sn | 3.2 | 959/547 | 108 | 0.031 | 2.2 | 0.7 |
| Ex. 19 | 1.13/0.315/0.328/0.352/0.005 | Sn | 3.1 | 915/543 | 108 | 0.034 | 2.1 | 0.5 |
| Ex. 20 | 1.10/0.308/0.320/0.344/0.028 | Sn | 3.1 | 936/569 | 108 | 0.033 | 2.2 | 0.7 |
| Ex. 21 | 1.11/0.315/0.329/0.351/0.005 | W | 3.2 | 875/496 | 90 | 0.043 | 2.4 | 0.5 |
| Ex. 22 | 1.13/0.317/0.329/0.353/0.001 | W | 3.2 | 936/569 | 108 | 0.035 | 2.2 | 0.7 |

DESCRIPTION OF THE REFERENCE SIGNS

1 Separator
2 Positive electrode
3 Negative electrode
4 Electrode group
5 Battery can
6 Electrolytic liquid
7 Top insulator
8 Sealing body
10 Non-aqueous electrolyte secondary cell
21 Positive electrode lead
31 Negative electrode lead

The invention claimed is:

1. A positive electrode active material for a lithium secondary cell, having a layered structure and comprising at least nickel, cobalt and manganese, the positive electrode active material satisfying requirements (1), (2), and (3) below:
    (1) a composition represented by a composition formula:

$$Li[Li_x(Ni_\alpha Co_\beta Mn_\gamma M_\delta)_{1-x}]O_2,$$

wherein $0 \leq x \leq 0.10$, $0.30 < \alpha \leq 0.34$, $0.30 < \beta \leq 0.34$, $0.32 \leq \gamma < 0.40$, $0 \leq \delta \leq 0.10$, $\beta < \gamma$, $\delta + \alpha + \beta + \gamma = 1$, M represents at least one metal selected from the group consisting of Fe, Cu, Ti, Mg, Al, W, Zn, Sn, Zr, Ga and V;
    (2) a secondary particle diameter of 2 μm or more and 10 μm or less; and
    (3) a maximum peak value in a pore diameter range of 90 nm to 150 nm in a pore diameter distribution determined by mercury porosimetry.

2. The positive electrode active material according to claim 1, wherein the secondary particle diameter is 2.5 μm or more and 7 μm or less.

3. The positive electrode active material according to claim 1, wherein a pore volume of pores having diameters in the range of 10 nm to 200 nm in the pore distribution determined by mercury porosimetry is 0.025 cm$^3$/g or more and 0.045 cm$^3$/g or less.

4. A positive electrode for a lithium secondary cell, comprising the positive electrode active material of claim 1.

5. A positive electrode for a lithium secondary cell, comprising the positive electrode active material of claim 3.

6. A lithium secondary cell, comprising the positive electrode of claim 4.

7. The positive electrode active material according to claim 2, which has a BET specific surface area of 1.5 m$^2$/g or more and 2.5 m$^2$/g or less.

8. The positive electrode active material according to claim 2, wherein a pore volume of pores having diameters in the range of 10 nm to 200 nm in the pore distribution determined by mercury porosimetry is 0.025 cm$^3$/g or more and 0.045 cm$^3$/g or less.

9. A positive electrode for a lithium secondary cell, comprising the positive electrode active material of claim 2.

10. A lithium secondary cell, comprising the positive electrode of claim 8.

11. A lithium secondary cell, comprising the positive electrode of claim 9.

12. The positive electrode active material according to claim 1, which has a BET specific surface area of 1.5 m$^2$/g or more and 2.5 m$^2$/g or less.

13. The positive electrode active material according to claim 12, wherein a pore volume of pores having diameters in the range of 10 nm to 200 nm in the pore distribution determined by mercury porosimetry is 0.025 cm$^3$/g or more and 0.045 cm$^3$/g or less.

14. A positive electrode for a lithium secondary cell, comprising the positive electrode active material of claim 12.

* * * * *